United States Patent
Yoshimura et al.

(10) Patent No.: US 7,418,443 B2
(45) Date of Patent: Aug. 26, 2008

(54) QUESTION ANSWERING SYSTEM, DATA SEARCH METHOD, AND COMPUTER PROGRAM

(75) Inventors: Hiroki Yoshimura, Kanagawa (JP);
Hiroshi Masuichi, Kanagawa (JP);
Tomoko Ohkuma, Kanagawa (JP);
Daigo Sugihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 448 days.

(21) Appl. No.: 11/302,226

(22) Filed: Dec. 14, 2005

(65) Prior Publication Data
US 2006/0277165 A1    Dec. 7, 2006

(30) Foreign Application Priority Data
Jun. 3, 2005    (JP)    ............................. 2005-163752

(51) Int. Cl.
*G06F 7/00*    (2006.01)
*G06F 17/30*    (2006.01)
*G06F 17/27*    (2006.01)

(52) U.S. Cl. ............................................. 707/4; 704/9

(58) Field of Classification Search ................. 707/2–6, 707/100, 101; 704/4, 9, 231; 706/231
See application file for complete search history.

(56) References Cited

U.S. PATENT DOCUMENTS

| | | | | |
|---|---|---|---|---|
| 5,694,523 A | * | 12/1997 | Wical | 706/45 |
| 5,774,845 A | * | 6/1998 | Ando et al. | 704/231 |
| 6,243,670 B1 | * | 6/2001 | Bessho et al. | 704/9 |
| 6,460,034 B1 | * | 10/2002 | Wical | 707/5 |
| 2003/0158723 A1 | * | 8/2003 | Masuichi et al. | 704/4 |
| 2003/0233226 A1 | * | 12/2003 | Kim et al. | 704/4 |
| 2004/0078193 A1 | * | 4/2004 | Masuichi et al. | 704/9 |

FOREIGN PATENT DOCUMENTS

JP    A 2002-132811    5/2002

OTHER PUBLICATIONS

Sebastiani; "Machine Learning in Automated Text Categorization"; ACM Computing Surveys, vol. 34, No. 1, Mar. 2002, pp. 1-47.

(Continued)

*Primary Examiner*—Hung T Vy
(74) *Attorney, Agent, or Firm*—Oliff & Berridge, PLC

(57) ABSTRACT

A question answering system includes a question answering unit, an analysis unit, a tree structure generation unit, a feature extraction unit, an evaluation unit and a re-ranking unit. The question answering unit executes search processing based on an input question and acquires answer candidates to the question. The analysis unit executes syntactic analysis processing or syntactic and semantic analysis processing on a passage obtained as a result of the search processing. The tree structure generation unit generates a tree structure based on an analysis result. The feature extraction unit extracts a relation between a search word applied in the search processing and each acquired answer candidate as a feature corresponding to each answer candidate from the tree structure. The evaluation unit determines an evaluation value of each answer candidate based on the feature extracted. The re-ranking unit re-ranks the answer candidates based on the evaluation values.

13 Claims, 15 Drawing Sheets

OTHER PUBLICATIONS

Kurata et al; "Question Answering System with Graph Structure from Dependency Analysis"; Graduate School of Information Science and Technology, University of Tokyo, 2003, pp. 69-74; with abstract, no month, day.

Ramakrishnan et al; "Is Question Answering an Acquired Skill?"; WWW2004; May 17-22, 2004; New York; pp. 111-120.

Masuichi et al; "Constructing a practical Japanese Parser based of Lexical Functional Grammar"; vol. 10, No. 2, Apr. 2003, pp. 79-109; with abstract.

Butt et al; "The Parallel Grammar Project"; pp. 1-7, no year, month, day.

Masuichi et al; "Japanese Parser on the basis of the Lexical-Functional Grammar Formalism and its Evaluation"; PACLIC17; Language, Information and Computation; Oct. 1-3, 2003; Sentosa, Singapore; Colips Publications; pp. 298-309.

Kaplan et al; "Lexical-Functional Grammar: A Formal System for Grammatical Representation"; The Mental Representation Of Grammatical Relations; The MIT Press, 1982; pp. 1-102, no month, day.

Murata et al; "An Estimate of Referent of Nouns in Japanese Sentences with Referential Property of Nouns"; vol. 1, No. 1, pp. 1-16; with abstract, no month, day.

* cited by examiner

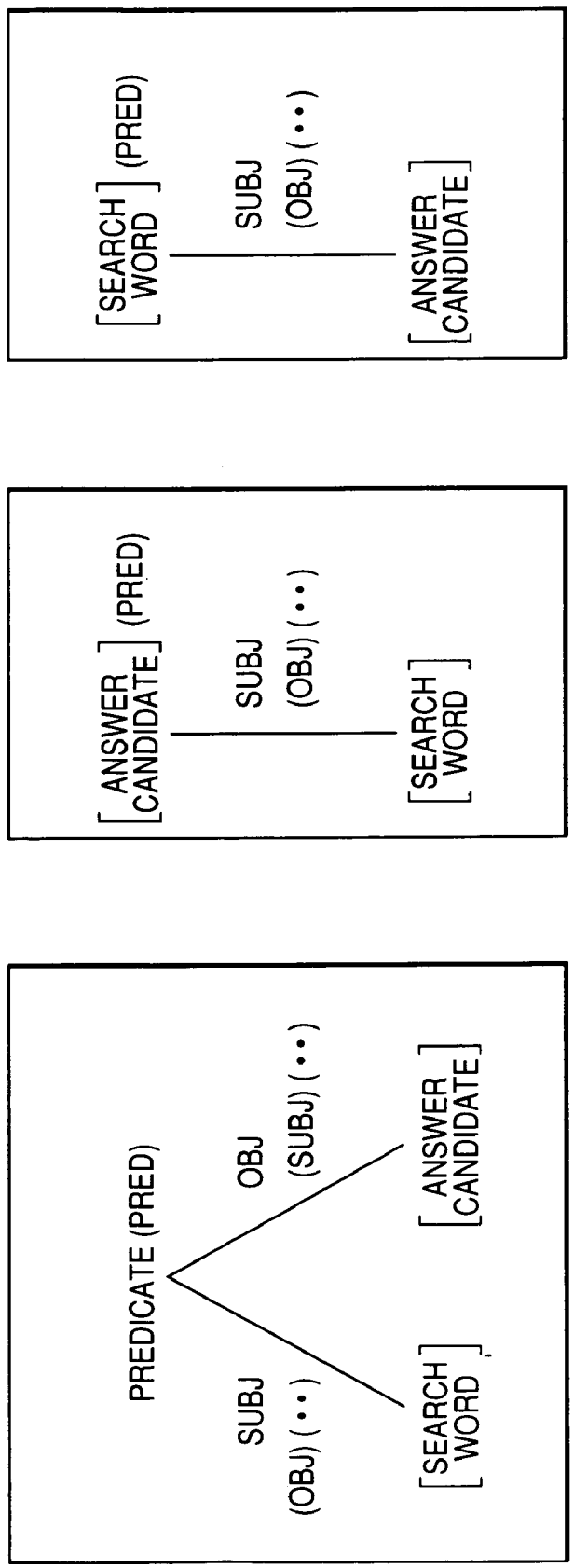

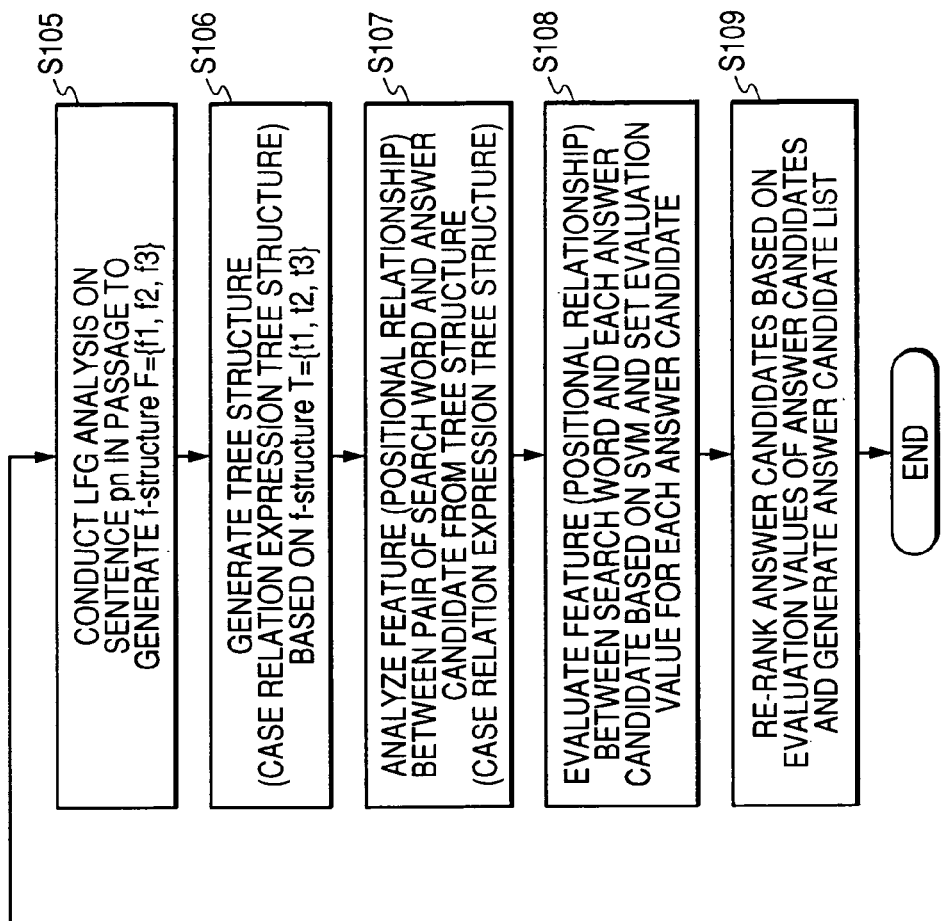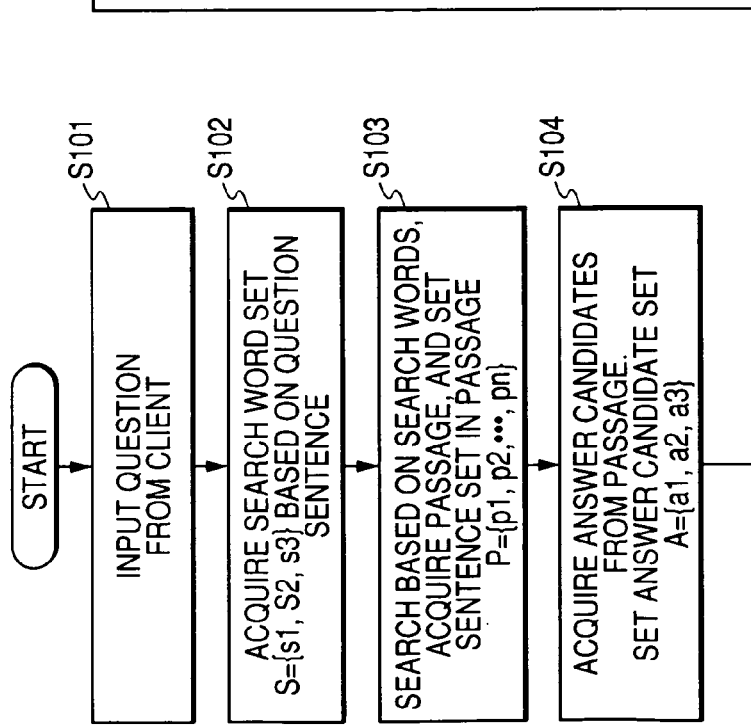
FIG. 7

FIG. 8

|     | a1   | a2   | a3   |
| --- | ---- | ---- | ---- |
| s1  | s1a1 | s1a2 | s1a3 |
| s2  | s2a1 | s2a2 | s2a3 |
| s3  | s3a1 | s3a2 | s3a3 |

FIG. 9

|     | a1       | a2          | a3           |
| --- | -------- | ----------- | ------------ |
| s1  | SUBJ-OBJ | OBJ-ADJUNCT | OBJ-OBJ      |
| s2  | OBJ-SUBJ | –           | SUBJ-ADJUNCT |
| s3  | SUBJ-OBJ | –           | SUBJ-OBJ     |

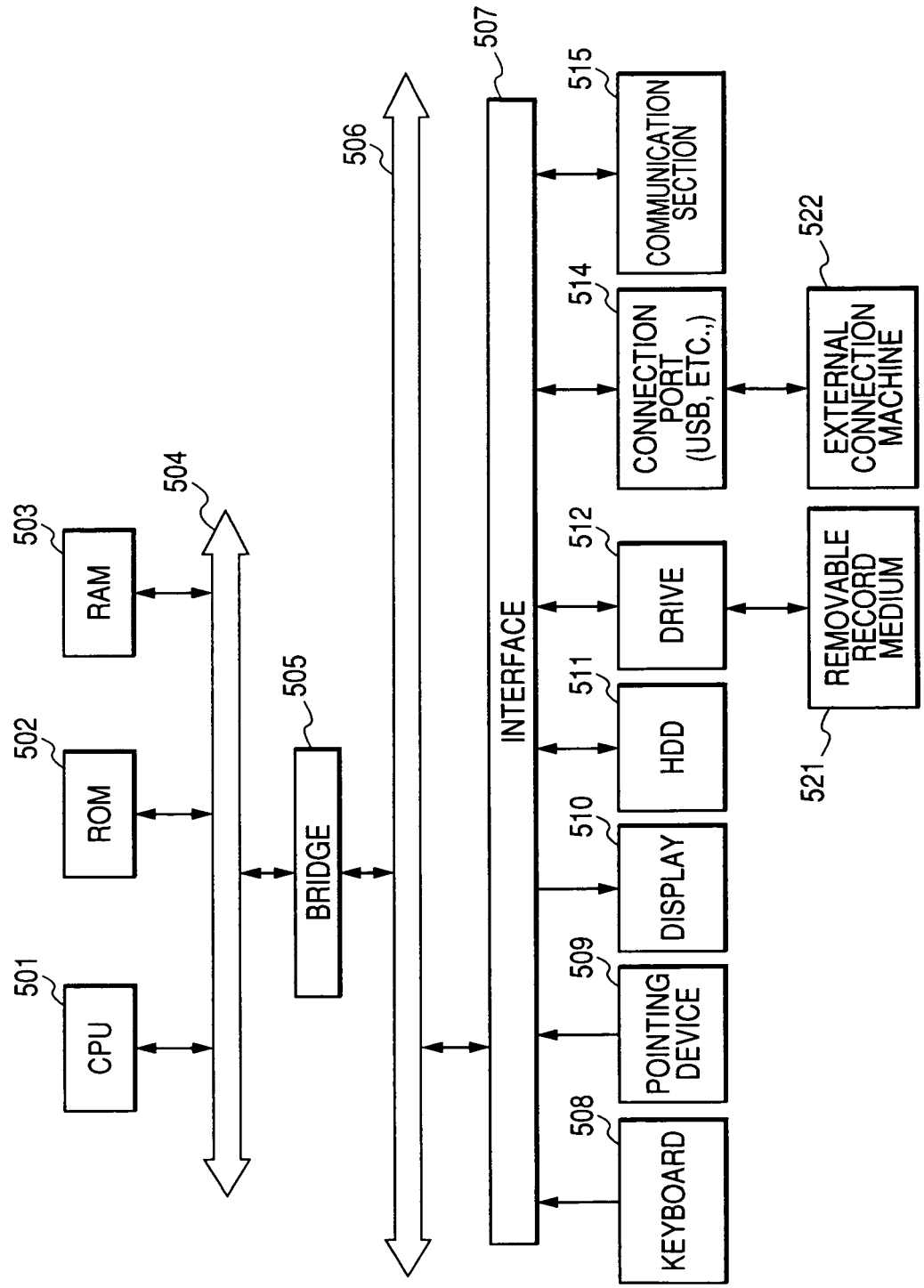

QUESTION ANSWERING SYSTEM, DATA SEARCH METHOD, AND COMPUTER PROGRAM

BACKGROUND OF THE INVENTION

1. Field of the Invention

This invention relates to a question answering system, a data search method, and a computer program, and more particularly to a question answering system, a data search method, and a computer program, which can provide a more precise answer to a question in a system wherein the user enters a question sentence and an answer to the question is provided.

2. Description of the Related Art

Recently, network communications through the Internet, etc., have grown in use and various services have been conducted through the network. One of the services through the network is search service. In the search service, for example, a search server receives a search request from a user terminal such as a personal computer or a mobile terminal connected to the network and executes a process responsive to the search request and transmits the processing result to the user terminal.

For example, to execute search process through the Internet, the user accesses a Web site providing search service and enters search conditions of a keyword, category, etc., in accordance with a menu presented by the Web site and transmits the search conditions to a server. The server executes a process in accordance with the search conditions and displays the processing result on the user terminal.

Data search process involves various modes. For example, a keyword-based search system wherein the user enters a keyword and list information of the documents containing the entered keyword is presented to the user, a question answering system wherein the user enters a question sentence and an answer to the question is provided, and the like are available. The question answering system is a system wherein the user need not select a keyword and can receive only the answer to the question; it is widely used.

For example, JP 2002-132811 A discloses a typical question answering system. JP 2002-132811 A discloses a question answering system configuration including a question analysis section, an information inspection section, an answer extraction section and a ground presentation section. The question analysis section determines a search word (search keyword) set and the question type from a question sentence presented by the user. The information inspection section makes a search based on the search word (search keyword) set to extract a passage as a sentence including the search word. The answer extraction section extracts several answer candidates from the passage. The ground presentation section presents the ground of the answer candidates.

In such a question answering system, the answer extraction section performs a processing of extracting an answer corresponding to the user question from among the search results; it is not easy to precisely extract only the answer corresponding to the user question from among a large number of search results obtained from the information inspection section.

Then, a technique of inspecting the extracted answer candidate based on hypothesis that a positional relationship between the search word and the answer candidate appearing in a sentence in a passage has a feature is developed. For example, "Is Question Answering an Acquired Skill?" (Ganesh Ramarkrishhnan, Soumen Chakrabarti, Deepa Paranjpe, Pushpak Bhattacharya, in proceedings of the 13th international conference on World Wide Web, pp. 111-120 (2004)) discloses the processing configuration wherein the nearness of a distance between the clauses of the search word and the answer candidate contained in the passage is learned with a decision tree and an answer candidate is selected.

"Question Answering System with Graph Structure from Dependency Analysis" (KURATA Gakuto, OKASAKI Naomi, ISHIZUKA Mitsuru, Information Processing Society of Japan Report NL-158, pp/69-74 (2003)) discloses the processing configuration wherein the results of conducting syntactic analysis on sentences in a passage are graphed and the calculation result of the distance between the search word and the answer candidate contained in the graph is used for ranking the answer candidates.

As described above, if the knowledge sources to be searched, such as a database and a Web page, are searched based on a user question and the extracted passage (sentence group containing search keyword) contains an answer fitted to the question, it is difficult for the question answering system of the related art to efficiently extract an appropriate answer required by the user.

As described above, each of "Is Question Answering an Acquired Skill?" and "Question Answering System Using Graph Structure Based On Modification Relationship" discloses the processing configuration for selecting the answer candidates. Of the related art, in "Is Question Answering an Acquired Skill?", if a sentence has a complicated structure made up of compound sentences, complex sentences, or a large number of modifiers, the clauses containing the search word and the answer candidate tend to be at a distance from each other; this is a problem. In this case, if measurement of the distance between clauses is learned, the appropriate relationship between the search word and the answer candidate is not extracted, and thus an erroneous learning result is output; this is a problem.

In "Question Answering System Using Graph Structure Based On Modification Relationship", the sentence set in the corresponding passage is graphed collectively and the distance is calculated and thus it is impossible to take out the precise relationship between the search word and the answer candidate in comparison with distance calculation in sentence units and it is difficult to appropriately rank the answer candidates; this is a problem.

SUMMARY OF THE INVENTION

The invention provides a question answering system, a data search method, and a computer program, which can improve answer accuracy by considering a relationship between answer candidates contained in sentences in a passage acquired by search processing based on a user question.

Particularly, the invention provides a question answering system, a data search method, and a computer program, which evaluates search words and answer candidates obtained in the question answering system with using a fine feature of a sentence structure, that is, a case relation (what are the subject and the object relative to a predicate, etc.,) as data in machine learning technique data to re-rank the answer candidates with high inspection capability and can efficiently present an appropriate answer.

The related arts so far do not include an art of conducting fine analysis on a sentence and inspecting answer candidates. To obtain a right answer, it is useful to learn a pattern of a partial structure of a sentence containing answer candidates of a right answer and an incorrect answer. The invention has a configuration for efficiently extracting an appropriate answer to a question by performing such sentence analysis processing.

According to one embodiment of the invention, a question answering system includes a question answering unit, a tree structure generation unit, a feature extraction unit, an evaluation unit and a re-ranking unit. The question answering unit executes search processing on a basis of an input question and acquires answer candidates to the question. The analysis unit executes syntactic analysis processing or syntactic and semantic analysis processing on a passage obtained as a result of the search processing executed by the question answering unit. The tree structure generation unit generates a tree structure on a basis of an analysis result of the analysis unit. The feature extraction unit extracts a relation between a search word applied in the search processing executed by the question answering unit and each acquired answer candidate as a feature corresponding to each answer candidate from the tree structure generated by the tree structure generation unit. The evaluation unit determines an evaluation value of each answer candidate on a basis of the feature extracted by the feature extraction unit. The re-ranking unit re-ranks the answer candidates on a basis of the evaluation values determined by the evaluation unit.

According to one embodiment of the invention, a data search method includes executing search processing on a basis of an input question and acquires answer candidates to the question; executing syntactic analysis processing or syntactic and semantic analysis processing on a passage obtained as a result of the search processing; generating a tree structure on a basis of a result of the analysis; extracting a relation between a search word applied in the search processing and each acquired answer candidate as a feature corresponding to each answer candidate from the tree structure generated; determining an evaluation value of each answer candidate on a basis of the feature extracted; and re-ranking the answer candidates on a basis of the evaluation values determined.

According to one embodiment of the invention, a computer program is stored in a recording medium. The computer program causes a computer to execute a data search processing comprising. The data search processing includes executing search processing on a basis of an input question and acquires answer candidates to the question; executing syntactic analysis processing or syntactic and semantic analysis processing on a passage obtained as a result of the search processing; generating a tree structure on a basis of a result of the analysis; extracting a relation between a search word applied in the search processing and each acquired answer candidate as a feature corresponding to each answer candidate from the tree structure generated; determining an evaluation value of each answer candidate on a basis of the feature extracted; and re-ranking the answer candidates on a basis of the evaluation values determined.

The computer program of the invention is a computer program that can be provided by a record medium or a communication medium for providing the computer program for a computer system that can execute various program codes in a computer-readable format, for example, a record medium such as a CD, an FD, or an MO or a communication medium such as a network. Such a program is provided in the computer-readable format, whereby processing responsive to the program is realized in a computer system.

The above and other objects, features and advantages of the invention will be apparent from the following detailed description of the preferred embodiment of the invention in conjunction with the accompanying drawings. The system in the specification is a logical set made up of a plurality of units (apparatus) and is not limited to a set of units (apparatus) housed in a single cabinet.

According to the configuration set forth above, it becomes possible to provide answer candidates in which a more precise answer to the question is presented in high place of the list.

BRIEF DESCRIPTION OF THE DRAWINGS

Embodiment of the invention will be described in detail based on the following figures, wherein:

FIG. 6 is a drawing to describe examples of relations and features in the tree structure between a search word and an answer candidate extracted from the tree structure by feature extraction unit;

FIG. 7 is a flowchart to describe the processing sequence executed by the question answering system according to one embodiment of the invention;

FIG. 8 is a drawing to describe a feature table generated by the question answering system according to one embodiment of the invention;

FIG. 9 is a drawing to describe a complete feature table generated by the question answering system according to one embodiment of the invention;

FIG. 16 is a block diagram to describe a hardware configuration example of the question answering system according to one embodiment of the invention.

DETAILED DESCRIPTION OF EMBODIMENTS OF THE INVENTION

A question answering system, a data search method, and a computer program according to embodiments of the invention will be discussed in detail with reference to the accompanying drawings.

FIRST EXAMPLE

Figure 1:
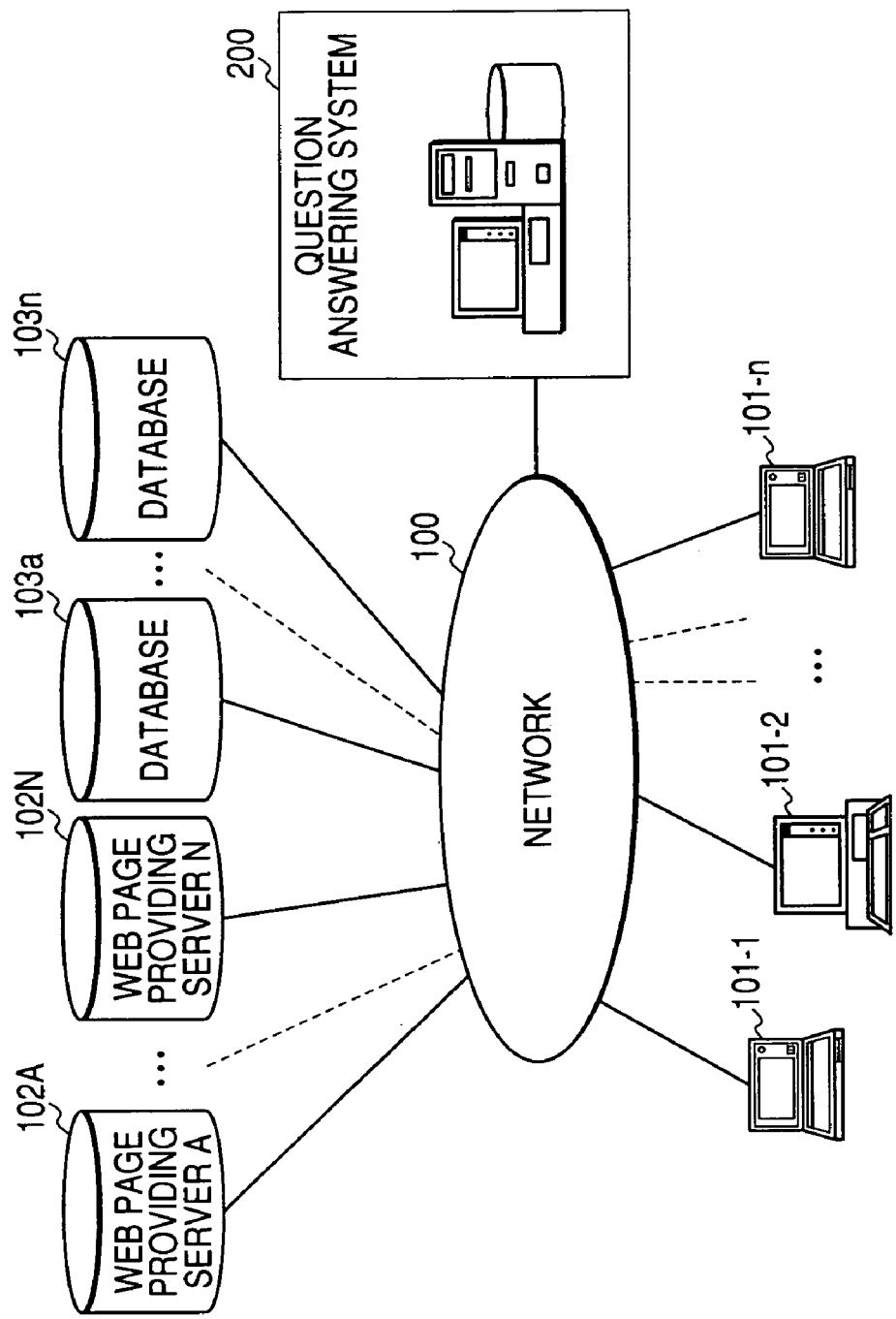
FIG. 1 is a drawing of the network configuration to show an application example of a question answering system according to one embodiment of the invention.

To begin with, one example of the question answering system of the invention will be discussed with reference to FIG. 1. FIG. 1 is a drawing to show the network configuration wherein a question answering system 200 according to one embodiment of the invention is connected to a network. A network 100 shown in FIG. 1 may be the Internet, an intranet, etc. Connected to the network 100 are clients 101-1 to 101-$n$ as user terminals for transmitting a question to the question answering system 200 and various Web page providing servers 102A to 102N for providing Web pages as materials to acquire answers to the clients 101-1 to 101-$n$ and databases 103$a$ to 103$n$.

The question answering system 200 is input to various question sentences generated by the users from the clients 101-1 to 101-$n$ and provides answers to the input questions for the clients 101-1 to 101-$n$. The answers to the questions are acquired from the Web pages provided by the Web page providing servers 102A to 102N, document data stored in the databases 103$a$ to 103$n$, and the like. The Web pages provided by the Web page providing servers 102A to 102N and the data stored in the databases 103$a$ to 103$n$ are data to be searched and are called knowledge sources.

The Web page providing servers 102A to 102N provide Web pages as pages opened to the public by a WWW (World Wide Web) system. The Web page is a data set displayed on a Web browser and includes text data, HTML layout information, images, audio, moving images, etc., embedded in a document. A set of Web pages form a Web site, which includes a top page (home page) and other Web pages linked from the top page.

The configuration and processing of the question answering system 200 will be discussed with reference to FIG. 2. The question answering system 200 is connected to the network 100 and executes processing of receiving a question from a client connected to the network 100, searching for an answer the Web pages provided by the Web page providing servers and other databases connected to the network 100, which serve as the knowledge sources, generating a list of answer candidates, for example, and providing the list for the client.

The configuration of the question answering system 200 will be discussed with reference to FIG. 2. As shown in FIG. 2, the question answering system 200 has a question answering unit 210, a syntactic and semantic analysis unit 221, a tree structure generation unit 222, a feature extraction unit 223, an evaluation unit 224, a re-ranking unit 225, and a learning database 230. The processing executed by each unit of the question answering system 200 will be discussed below.

Question Answering Unit

The question answering unit 210 searches the knowledge source of a database, a Web page, etc., based on a search word (search keyword) obtained from a question sentence using a general question answering system and outputs answer candidates from the passage obtained from the search result. Any of existing general question answering systems can be applied to the question answering unit 210 shown in FIG. 2. In the existing question answering system, plural answer candidates are often output.

Figure 3:
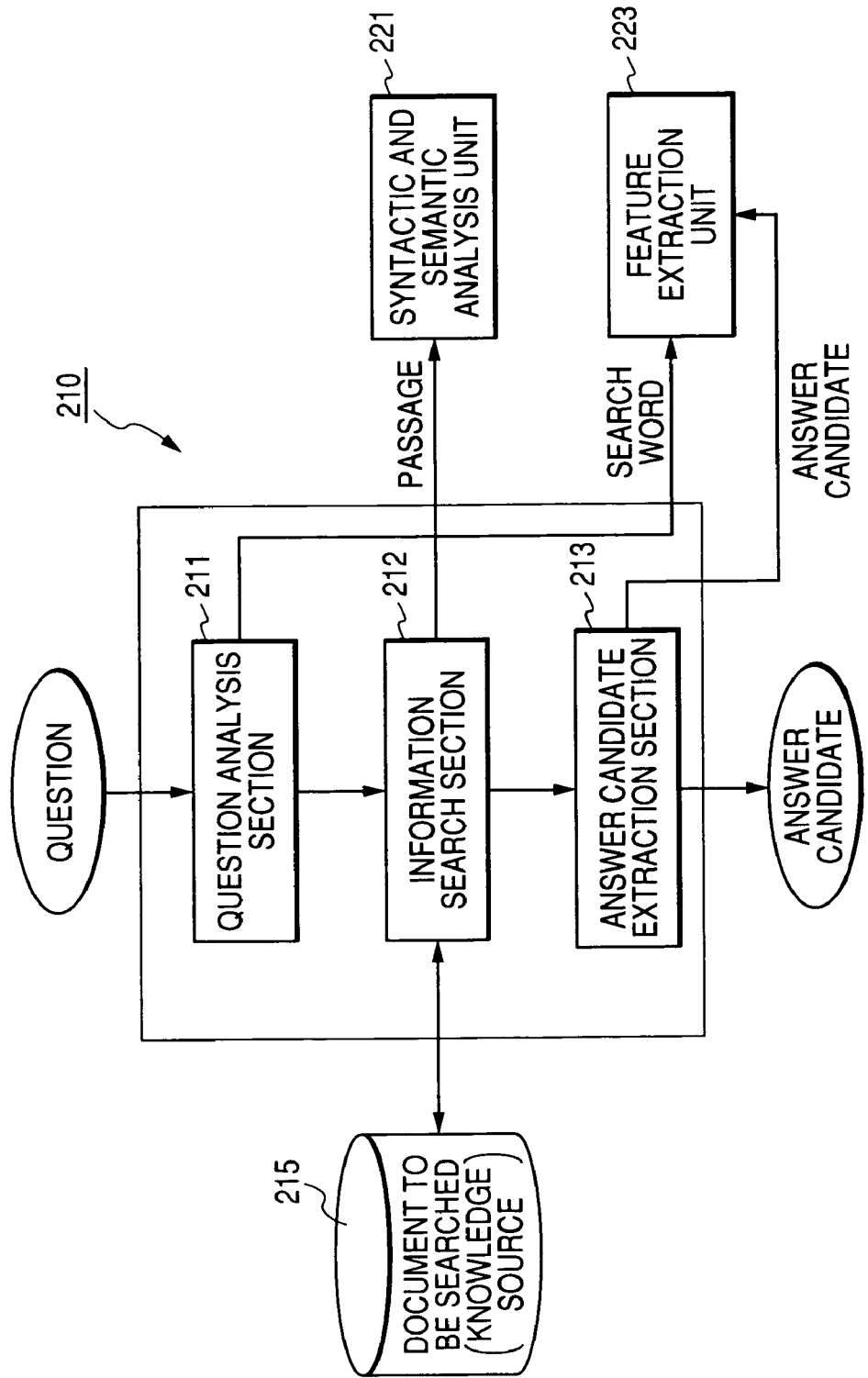
FIG. 3 is a diagram to describe the configuration and processing of question answering unit in the question answering system.

The process executed by the question answering unit 210 will be discussed with reference to FIG. 3. As shown in FIG. 3, the question answering unit 210 has a question analysis section 211, an information search section 212, and an answer candidate extraction section 213. The question analysis section 211 executes analysis processing of the input question. For example, the question analysis section 211 determines a question type as to whether an answer required by a question is a person, a place or the like and detects a feature word used as a search word (search keyword) from the question.

The information search section 212 executes a search based on the search word (search keyword) extracted by analysis of the question analysis section 211. That is, for example, the information search section 212 executes search processing using the Web pages provided by the Web page providing servers connected to the network and the databases connected to the network as documents to be searched (knowledge source) 215 and acquires a passage as a sentence group, which is determined to contain an answer to the question.

The answer candidate extraction section 213 executes processing of selecting answer candidates, which are determined to be appropriate as the answer to the question, from the passage serving as the sentence group extracted by the information search section 212. The question answering system of the related art presents answer candidates obtained at the point in time to the user as a list of the answer candidates, which are ranked based on the frequency of appearance, for example.

As described above, however, often the answer candidates obtained at the point in time do not contain an accurate answer to the user's question. The system according to this embodiment of the invention outputs the answer candidates extracted by the answer candidate extraction unit 213 to the syntactic and semantic analysis unit 221. Subsequently, the questioner in the syntactic and semantic analysis unit 221, the tree structure generation unit 222, the feature extraction unit 223, the evaluation unit 224 and the re-ranking unit 225 inspect the answer candidates and presents a ranking result of the answer candidates, which is more appropriate as the answer to the question, to the client (user). The processing executed by the syntactic and semantic analysis unit 221, the tree structure generation unit 222, the feature extraction unit 223, the evaluation unit 224, and the re-ranking unit 225 will be discussed below.

Syntactic and Semantic Analysis Unit

The syntactic and semantic analysis unit 221 is input to a passage, which is the search result acquired in the search processing based on the keyword and executed by the information search section 212 of the question answering unit 210 shown in FIG. 3. The passage includes sentences acquired obtained as a result of searching the knowledge source using the search word (search keyword) and is a set of sentences containing the search word (search keyword).

The syntactic and semantic analysis unit 221 conducts syntactic and semantic analysis on each sentence in the passage input from the information search section 212 based on the Lexical Functional Grammar (LFG).

The syntactic and semantic analysis processing will be discussed briefly. Natural languages described in various languages including Japanese and English essentially have abstract and highly ambiguous nature, but can be subjected to computer processing if sentences are handled mathematically. Consequently, various applications and services concerning natural languages can be provided by automation processing, such as machine translation, an interactive system, a search system, and a question answering system. The natural language processing generally is divided into processing phases of morphological analysis, syntactic analysis, semantic analysis, and context analysis.

In the morphological analysis, a sentence is divided into morphemes of minimal meaningful units and a certification process of part of speech is performed. In the syntactic analysis, a sentence structure of a phrase structure, etc., is analyzed based on grammar laws, etc. Since the grammar laws are of a tree structure, the syntactic analysis result generally becomes a tree structure where the morphemes are joined based on the modification relation, etc. In the semantic analysis, a semantic structure is synthesized to find a semantic structure representing the meaning of a sentence based on the meaning (notion) of the words in the sentence, the semantic relation between the words, etc. In the context analysis, text of a series of sentences (discourse) is assumed to be the basic unit of analysis and the semantic (meaningful) unit between the sentences is obtained and a discourse structure is formed.

The syntactic analysis and the semantic analysis are absolutely necessary arts to realize applications of an interactive system, machine translation, document proofreading support, document abstract, etc., in the field of the natural language processing.

In the syntactic analysis, a natural language sentence is received and a process of determining the modification relation between the words (segments) is performed based on the grammar laws. The syntactic analysis result can be represented in the form of a tree structure called dependency structure (dependency tree). In the semantic analysis, a process of determining the case relation in a sentence can be performed based on the modification relation between the words (segments). The expression "case relation" mentioned here refers to the grammar role such as subject (SUBJ) or object (OBJ) that each of the elements making up a sentence has. The semantic analysis may contain a process of determining the sentence tense, aspect, narration, etc.

As for an example of a syntactic and semantic analysis system, a natural language processing system based on LFG is described in detail in "Constructing a practical Japanese Parser based on Lexical Functional Grammar" (Masuichi and Ohkuma, natural language processing, Vol. 10. No. 2, pp. 79-109 (2003)), "The Parallel Grammar Project" (Miriam Butt, Helge Dyvik, Tracy Holloway King, Hiroshi Masuichi, and Christian Rohrer, In Proceedings of COLING-2002 Workshop on Grammar Engineering and Evaluation, pp. 1-7, (2002)), "Lexical-Functional Grammar: A formal system for grammatical representation" (Ronald M. Kaplan and Joan Bresnan, In Joan Bresnan, editor, The Mental Representation of Grammatical Relations, The MIT Press, Cambridge, Mass., pages 173-281, (1982), Reprinted in Dalrymple, Kaplan, Maxwell, and Zaenen, editors, Formal Issues in Lexical-Functional Grammar, 29-130. Stanford: Center for the Study of Language and Information, (1995)), and US 2003/0158723 A, entire contents of which are incorporated herein by reference in its entirety. For example, the natural language processing system based on LFG can also be applied as the question analysis section 301 in the question answering system of this embodiment.

The syntactic and semantic analysis unit 221 conducts passage analysis based on LFG to output a structure called f-structure (f-str) containing a case relation in the analysis result.

The f-structure (f-str) will be discussed with reference to FIG. 4. The f-structure represents semantic information such as a case structure, a tense, an aspect, and a narration of a sentence by a matrix structure of attributes-value on a basis of the concept of the grammatical function.

Figure 4:
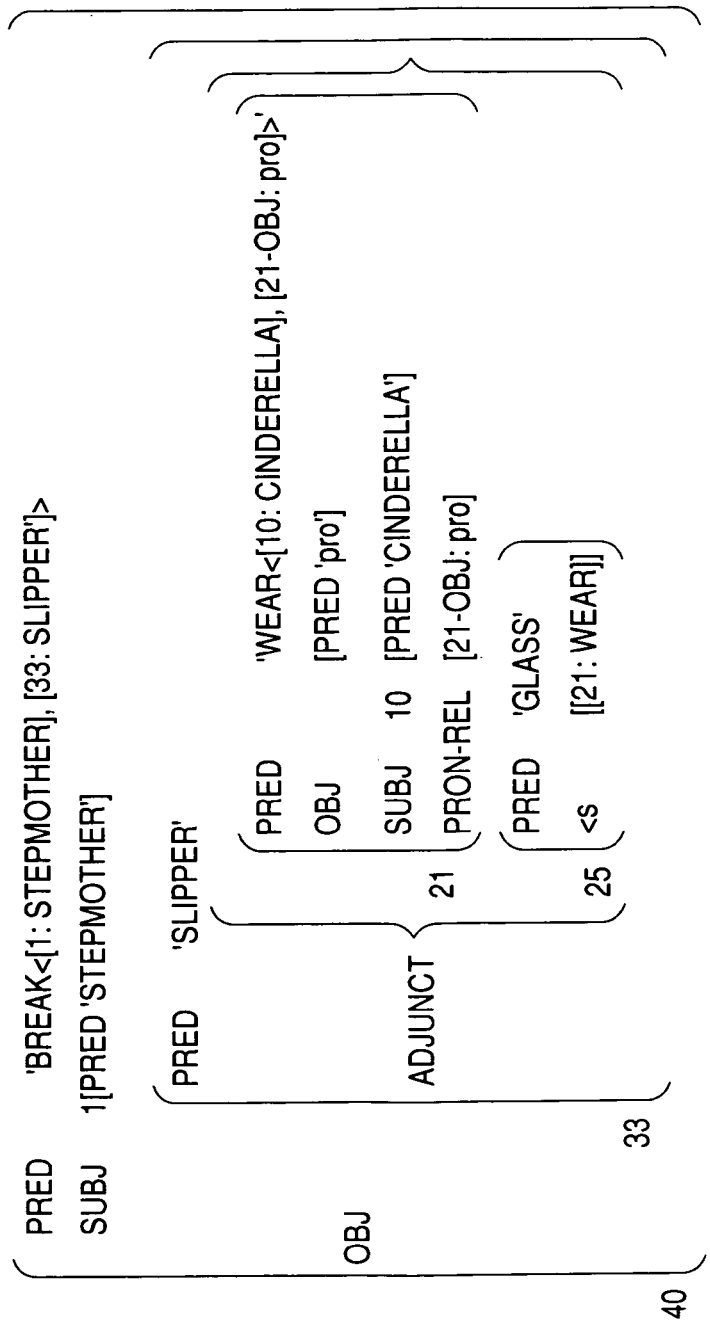
FIG. 4 is a drawing to describe a composition example of f-structure generated by syntactic and semantic analysis unit.

FIG. 4 shows the f-structure, which is a result of the syntactic and semantic analysis of a sentence "Stepmother broke a glass slipper Cinderella had worn." The f-structure represents clearly represents the grammatical function and includes grammatical function names, semantic formats, and feature symbols. Referring the f-structure, we can obtain semantic understanding of subject, object, complement, and adjunct.

The syntactic and semantic analysis unit 221 executes syntactic and semantic analysis based on Lexical Functional Grammar (LFG) on each sentence containing the keyword in the passage, which is obtained as the result of the knowledge source search based on the search word (keyword) and input from the information search section 212, and outputs the f-structure (f-str) containing the case relation as shown in FIG. 4 in the analysis result.

Tree Structure Generation Unit

The tree structure generation unit 222 is input to the f-structure (f-str) generated by the syntactic and semantic analysis unit 221 based on the passage, which is the search result, extracts the case relations from the f-structure, and generates a tree structure based on the case relations.

Figure 5A:
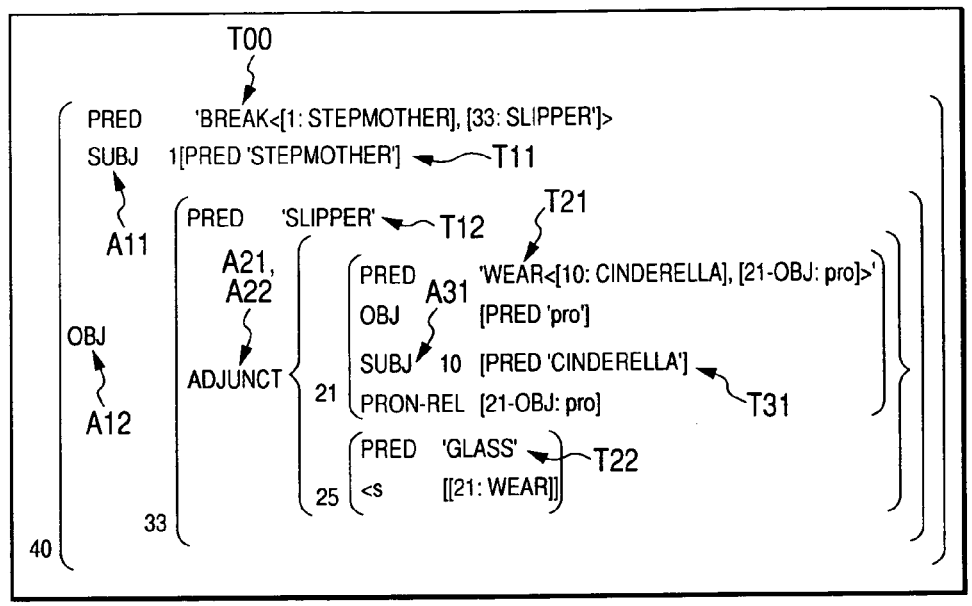
FIG. 5 is a drawing to describe a tree structure and generation processing of the tree structure based on f-structure by tree structure generation unit.
Figure 5B:
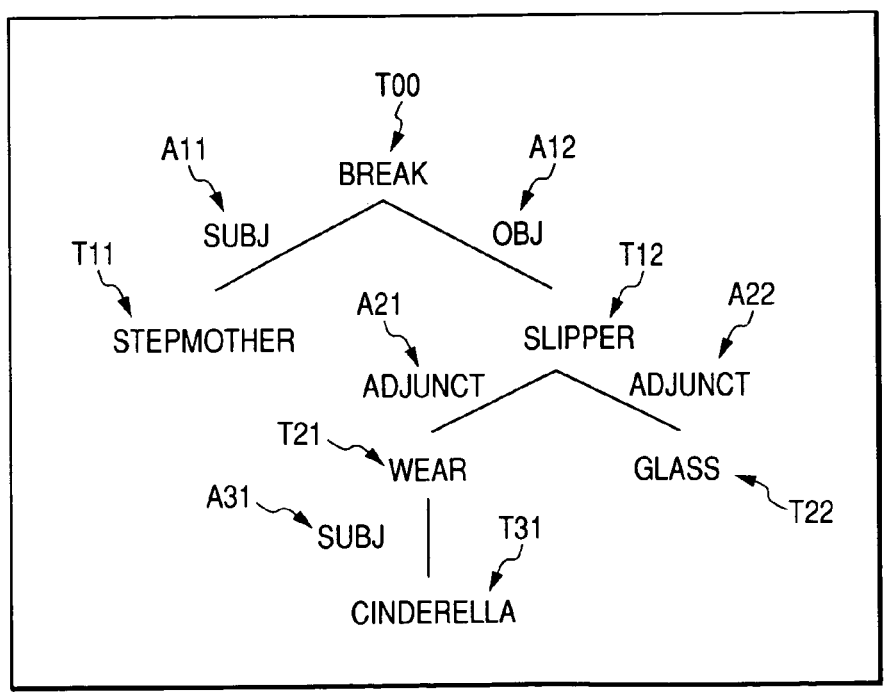

A generation processing example of the tree structure based on the f-structure (f-str) will be discussed with reference to FIG. 5. FIG. 5A shows the f-structure, which is the result of the syntactic and semantic analysis of the sentence "Stepmother broke the glass slipper Cinderella had worn" like that shown in FIG. 4. FIG. 5B shows the tree structure based on the case relations generated by extracting the case relations from the f-structure shown in FIG. 5A.

In the tree structure shown in FIG. 5B, Tnn indicates subject, predicate, object and the like contained in the sentence to be analyzed, and Ann indicates the case relation between the concatenated words. This tree structure is called a tree structure based on predicate-argument structure. The term Tnn shown in FIG. 5B corresponds to the term Tnn shown in the f-structure shown in FIG. 5A, and the case relation Ann shown in FIG. 5B corresponds to the case relation Ann shown in the f-structure shown in FIG. 5A.

The tree structure shown in FIG. 5B is generated by acquiring structures of the sentence such as subject, object, complement, and adjunct from the f-structure shown in FIG. 5A.

The word "break" in the upper left portion of the f-structure shown in FIG. 5A is set as the crest of the tree structure, the remaining words are acquired in order downward to the right, and the case relations of subject, object, complement, and adjunct are acquired from the f-structure and are set, whereby the tree structure can be generated.

Thus, the tree structure generation unit 222 is input to the f-structure (f-str) generated by the syntactic and semantic analysis unit 221 based on the passage, which is the search result, extracts the case relations from the f-structure, and generates the tree structure (tree structure based on predicated-argument structure) based on the case relations.

Feature Extraction Unit

The feature extraction unit 223 is input to the tree structure, which is generated by the tree structure generation unit 222 on the basis of the sentences forming the passage, and further input to the search words (search keywords) held by the question analysis section 211 of the question answering unit 210 shown in FIG. 3 and the answer candidates retained by the answer candidate extraction unit 213. The feature extraction unit 223 determines a positional relationship between the search words (search keywords) and the answer candidates in the tree structure generated based on the f-structure of the passage.

The feature extraction unit 223 determines whether or not the search words and the answer candidates are concatenated by the same predicate in the tree structure. If they are concatenated by the same predicate, the feature extraction unit 223 extracts the case relation (SUBJ, OBJ, etc.,). FIG. 6 shows examples of concatenation patterns of the search words and the answer candidates extracted from the tree structure (tree structure based on predicate-argument structure) by the feature extraction unit 223.

FIG. 6A shows a concatenation pattern between a search word and answer candidate where the search word and the answer candidate are concatenated by the same predicate (PRED).

FIG. 6B shows a concatenation pattern where the answer candidate is a predicate (PRED) and is directly connected to the search word with a case relation of subject, object and the like.

FIG. 6C a concatenation pattern where the search word is a predicate (PRED) and is directly connected to the answer candidate with a case relation of subject, object, and the like.

The feature extraction unit 223 is input to the tree structure, which is generated by the tree structure generation unit 222 on the basis of the sentences forming the passage, and further input to the search words (search keywords) held by the question analysis section 211 of the question answering unit 210 shown in FIG. 3 and the answer candidates retained by the answer candidate extraction unit 213. The feature extraction unit 223 analyzes case relations (e.g., case relations shown in FIGS. 6A to 6C) between the search words (search keywords) and the answer candidates in the tree structure generated based on the f-structure of the passage.

Evaluation Unit

The evaluation unit 224 is input to case relation information, which is extracted by the feature extraction unit 223, between the search words (search keywords) and the answer candidates in the tree structure based on the passage, which is the search result. The evaluation unit 224 determines whether or not the case relations between the search words (search keywords) and the answer candidates obtained from analysis of the tree structure are highly appropriate relation as the answer, on a basis of data (feature) for the machine learning previously collected and stored in the learning database 230 using Support Vector Machine (SVM), which is one of the machine learning techniques, and evaluates the appropriateness of each answer candidate.

The SVM is a machine learning technique of categorizing the features into right answers (positive examples) and incorrect answers (negative examples) and determining whether input data is a positive example or a negative example. The SVM is described in detail, for example, in document "Machine Learning in Automated Text Categorization" (Fabrizio Sebaastiani, ACM Computing Surveys Vol. 34, No. 1, pp. 1-47, (2002)) and references cited in this article.

The evaluation unit 224 evaluates the case relation information, which is extracted by the feature extraction unit 223, between the search words (search keywords) and the answer candidates in the tree structure based on the passage, which is the search result, with using SVM, which is one of the machine learning techniques and applying the data (features) for machine learning stored in the learning database 230. The evaluation unit 224 determines whether or not the case relations between the search words (search keywords) and the answer candidates obtained from the analysis of the tree structure are highly appropriate relation as the answer. The evaluation unit 224 gives an appropriateness evaluation value (e.g., numeric value) to each answer candidate.

Re-Ranking Unit

The re-ranking unit 225 is input to the appropriateness evaluation values of the answer candidates from the evaluation unit 224, sorts the answer candidates based on the evaluation values, and generates an answer candidate list. The generated answer candidate list is presented to the client (user) inputting the question into the question answering unit 210.

Next, a specific processing procedure executed by the question answering system according to this embodiment of the invention will be discussed with reference to a flowchart of FIG. 7.

First, at step S101, a question from the client (user) is input. Next, at step S102, the question analysis section 211 of the question answering unit 210 shown in FIG. 3 analyses a question sentence Q input by the client (user) by executing processing similar to that executed by a general question answering system, and extracts important words from the question sentence to select the search words applied as the search keywords. It is assumed that a search word set S={s1, s2, s3}.

At step S103, the information search section 212 of the question answering unit 210 searches the knowledge source using the search words and acquires a passage, which is a sentence group containing the search words. It is assumed that the sentence set in the acquired passage is P={p1, p2, . . . , pn}.

Next, at step S104, the answer candidate extraction unit 213 executes answer candidate extraction processing based on the passage and obtains answer candidates. It is assumed that a set of the answer candidates extracted by the answer candidate extraction unit 213 is an answer candidate set A={a1, a2, a3}. The question answering unit 210 executes the processing up to this point.

Next, the process goes to step S105. The syntactic and semantic analysis unit 221 executes step S105. The syntactic and semantic analysis unit 221 outputs f-structure (f-str), which is obtained by applying syntactic and semantic analysis based on the LFG to the sentence pn in the passage. The f-structure (f-str) has been previously described with reference to FIG. 4. The syntactic and semantic analysis unit 221 outputs a plurality of analysis results as the f-structure, depending on an input sentence (here, sentences forming the passage, which are the search result). It is assumed that f-structure set F={f1, f2, f3}.

Next, at step S106, a tree structure is generated for the f-structure set F={f1, f2, f3}. The tree structure generation unit 222 executes this processing. The tree structure generation unit 222 is input to the f-structure (f-str), which is generated by the syntactic and semantic analysis unit 221 on the basis of the passage as the search result, extracts the case relations from the f-structure, and generates the tree structure based on the case relations as previously described with reference to FIG. 5.

It is assumed that the tree structure set generated from the f-structure set F is T={t1, t2, t3}. The elements of the f-structure set and the elements of the tree structure set T have one to one relation. For example, the tree structure of the element f1 of the f-structure set F corresponds to that of the element t1 of the tree structure set T. The tree structure has data structure wherein node ID, parent ID of a node, and the case information of SUBJ, OBJ and the like are described for each node as previously described with reference to FIG. 5.

Next, at step S107, the feature (case relation) of each pair of search word and answer candidate is analyzed from the tree structure (tree structure based on predicate-argument structure). The feature extraction unit 223 executes this processing.

The feature extraction unit 223 first creates a feature table from the search word set S={s1, s2, s3} and the answer candidate set A={a1, a2, a3} as preparation for extracting the features based on the tree structure. The feature table is a table to which case information of a pair of a search work and an answer candidate is input when a tree structure containing the pair of the search word and the answer candidate is found. FIG. 8 shows the feature table of this example.

In this example, the search word set S={s1, s2, s3} and the answer candidate set A={a1, a2, a3} exist and the respective set contain three search words and three answer candidates. The feature table shown in FIG. 8 is generated as a table to record the features about all combinations (case relations in the tree structure). For example, the feature about the pair of search word s1 and answer candidate a1 (the case relation in the tree structure) is recorded in the box of s1a1. The feature table is set as a table having entry boxes responsive to the numbers of search words and answer candidates.

Further, the feature extraction unit 223 checks whether or not the tree structure contains each pair of a search word and an answer candidate in the feature table for each tree structure of the tree structure set T. When the tree structure contains a pair of a search word and an answer candidate, if the search word and the answer candidate are concatenated by the same predicate, the case relation is extracted. The extracted case relation is adopted as the feature. The acquired feature of the search word and the answer candidate is entered in the corresponding box of the feature table to complete the feature table.

FIG. 9 shows an example of the feature table in which a feature between a search word and an answer candidate extracted from the tree structure are entered for each of the pairs of the elements of the search word set S={s1, s2, s3} and the answer candidate set A={a1, a2, a3}. In the example shown in FIG. 9, the feature between the search word s1 and the answer candidate a1 (the case relation in the tree structure) is the relation of subject (SUBJ) and object (OBJ) This corresponds to the relation in FIG. 6A.

Figure 10B:
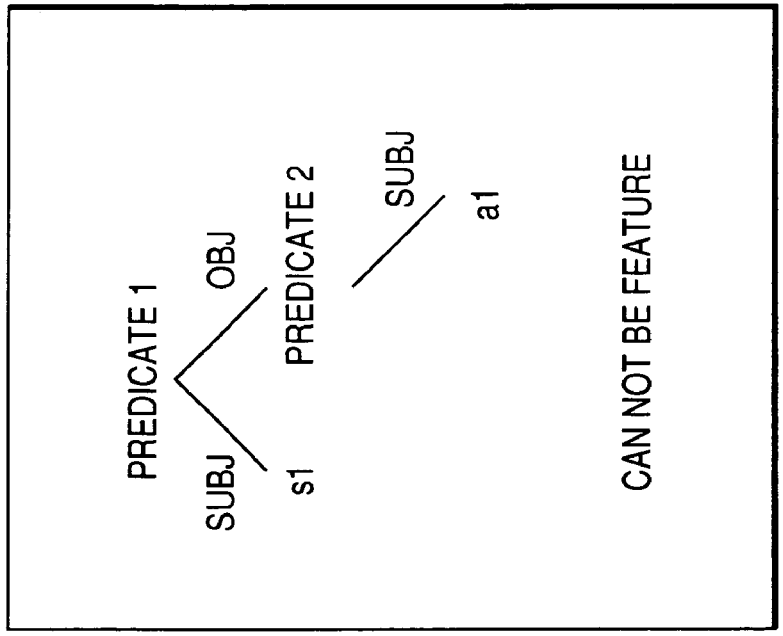
FIG. 10 is a drawing to describe a feature extracted in the question answering system according to one embodiment of the invention.
Figure 10A:
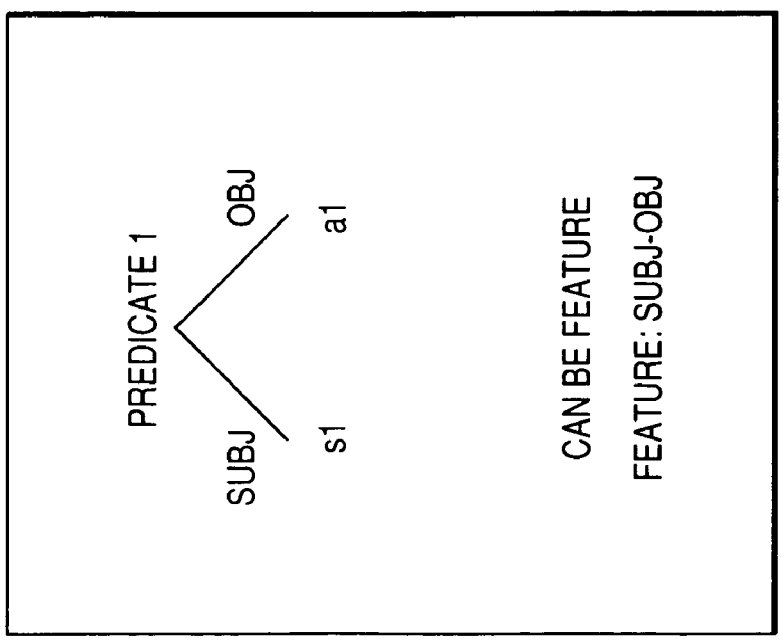

An example of the search word and the answer candidate to be registered in the feature table will be discussed with reference to FIG. 10. FIG. 10A shows a relation in which a search word and an answer candidate are concatenated by the same predicate, and therefor the search word and the answer candidate are registered in the feature table. In this case, the feature between the search word (s1) and the answer candidate (a1) is [SUBJ-OBJ]. On the other hand, a search word (s1) and an answer candidate (a1) shown in FIG. 10B are not concatenated by the same predicate and therefore, are not registered in the feature table.

Such analysis of the features between search words and answer candidates is created for each answer candidate, for each tree structure. Further, at step S107, the feature tables each created for the respective tree structures are collected in the unit of the thee structure set t and sorted for each answer candidate {a1, a2, a3}. Accordingly, the feature for each answer candidate is completed.

Next, at step S108, evaluation is conducted for each answer candidate using the SVM. The evaluation unit 224 executes this processing. In the SVM, a learning model learning previously created learning data using the SVM is used. As the learning data, features of right answer and incorrect answer are provided manually.

The evaluation unit 224 evaluates the case relation information, which is extracted by the feature extraction unit 223, between the search word (search keyword) and the answer candidate in the tree structure based on the passage as the search result with using the SVM, which is one of the machine learning techniques, and applying the machine learning data (feature) stored in the learning database 230. The evaluation unit 224 determines whether or not the case relations between the search words (search keywords) and the answer candidates obtained from the analysis of the tree structure are the highly appropriate relation as the answer. The evaluation unit 224 gives the appropriateness evaluation value (e.g., numeric value) to the answer candidates. For example, the evaluation values are set for the answer candidates a1, a2, and a3 as follows:

a1=(0, 50)
a2=(-1, 03)
a3=(0, 90)

Next, at step S109, the answer candidates are re-ranked based on the evaluation values obtained by the evaluation. The re-ranking unit 225 executes this processing. For example, assuming that a1=(0, 50), a2=(-1, 03), and a3=(0, 90) are the evaluation values obtained from the evaluation result, the re-ranking unit 225 generates a list of the answer candidates in the descending order of the evaluation values, namely, generates a list of the answer candidates a3, a1, a2 in this order, and presents the list to the client (user) inputting the question into the question answering unit 210.

Thus, the question answering system according to this embodiment of the invention generates a tree structure (tree structure based on predicate-argument structure) expressing a relation between a search word generated in a general question answering system and an answer candidate acquired from a passage obtained as the search result as the tree structure; analyzes the tree structure (the tree structure based on predicate-argument structure); further analyzes a feature between the search word and the answer candidate (a case relation between the search word and the answer candidate) based on the tree structure generated from the passage; evaluate each answer candidate using the SVM based on the analyzed relation; acquires evaluation value for each answer candidate by the evaluation; re-ranks the answer candidates based on the acquired evaluation values, generates an answer candidate list in the evaluation value order, and presents the list to a client (a user as a questioner). Therefore, it is becomes possible to present a list in which an answer, which would be highly appropriate answer to the question, is in high place to the client.

In this example, English language processing has been described, but the invention can also be applied to other languages such as Japanese and French in a similar manner.

OTHER EXAMPLES

Next, examples each having a different configuration from that of the above-described example of the question answering system will be described.

SECOND EXAMPLE

In the example described above, the evaluation unit 224 shown in FIG. 2 uses the data stored in the learning database 230 and conducts evaluation according to one machine learning technique based on the SVM. However, the evaluation technique incorporating the machine learning technique is not limited to the SVM, and other various techniques can also be applied. Also, a plurality of techniques can be used in combination.

The evaluation techniques incorporating the machine learning technique include Maximum Entropy technique and the like as well as the SVM. Thus, a plurality of machine learning techniques are used for evaluation, whereby more objective evaluation is made possible. Such an evaluation configuration incorporating a plurality of machine learning techniques will be discussed with reference to FIG. 11.

Figure 2:
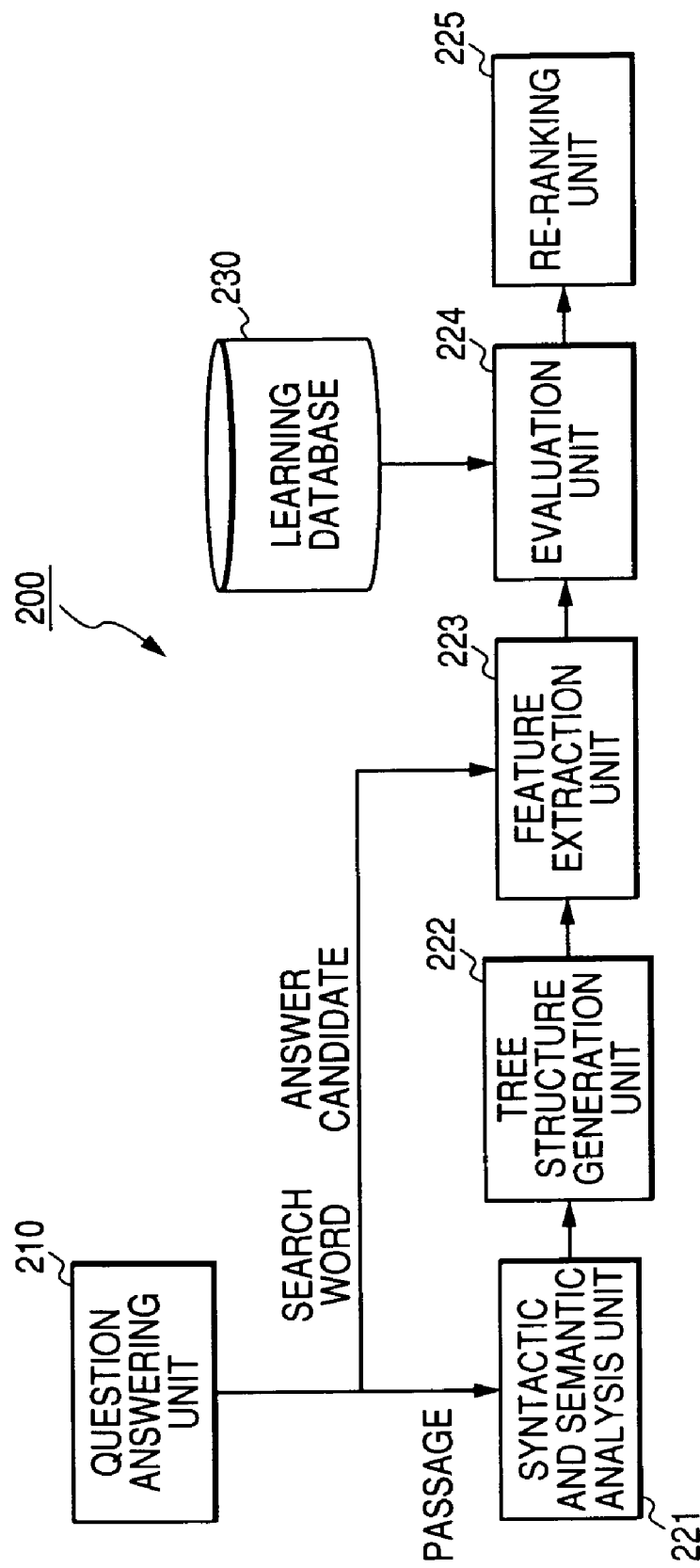
FIG. 2 is a block diagram to describe the configuration of the question answering system according to one embodiment of the invention.
Figure 11:
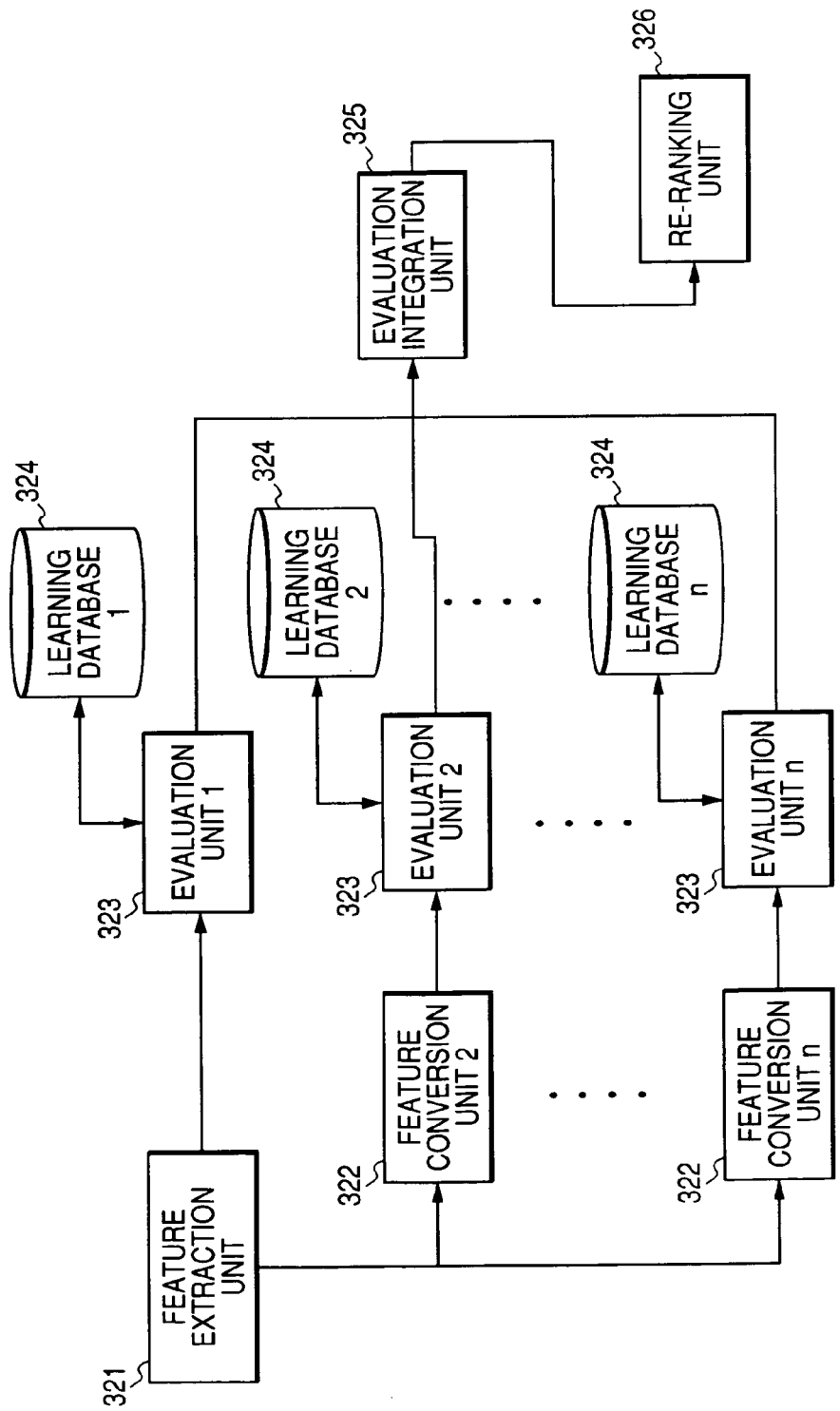
FIG. 11 is a block diagram to show the configuration of evaluation unit of the question answering system according to one embodiment of the invention (second example)

FIG. 11 shows a modified configuration example of the feature extraction unit 223, the evaluation unit 224, the learning database 230 and the re-ranking unit 225 of the question answering system shown in FIG. 2. Other components are similar to those shown in FIG. 2. In the modified configuration example, a plurality of evaluation unit 1 to n are provided as evaluation units 323. The evaluation units 323 apply different machine learning techniques, hold different learning data in learning databases 1 to n (324), apply the above-described SVM, Maximum Entropy technique and the like, separately, and evaluate the features extracted by feature extraction unit 321.

However, there is a machine learning technique in which the features extracted by the feature extraction unit 321 cannot be used intact. Therefore, in the modified configuration example, feature conversion units 322 each for converting the feature into a feature that can be evaluated are provided. Each feature conversion unit 322 performs processing of converting the feature data extracted by the feature extraction unit 321 into data that can be evaluated according to the machine learning technique applied by the evaluation unit 323 at the following stage.

The evaluation results according to different machine learning techniques are input to an evaluation integration unit 325, which calculates a total evaluation value by performing computation processing of weighted average, etc., for example. The evaluation value is set for each answer candidate as with the example described above. Re-ranking unit 326 re-ranks the answer candidates based on the total evaluation values, generates an answer candidate list, and presents the list to the client (the user of the questioner).

According to the modified configuration example, various machine learning techniques are adopted and the evaluation results are collected together, whereby it can be expected that accuracy of the evaluation will be enhanced. Accordingly, it is made possible to enhance the accuracy of re-ranking in presenting the answer candidates.

THIRD EXAMPLE

Figure 12:
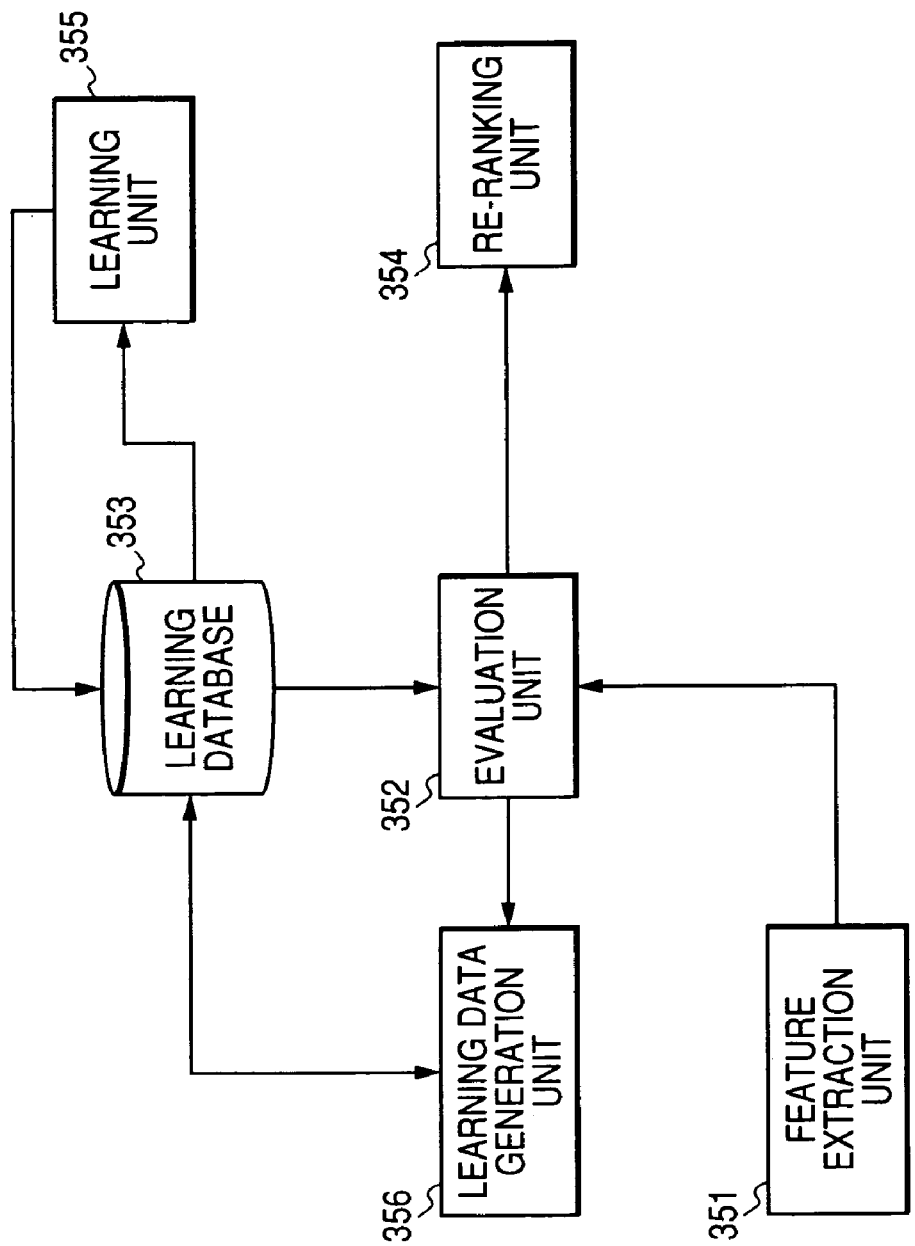
FIG. 12 is a block diagram to show the configuration of evaluation unit of the question answering system according to one embodiment of the invention (third example)

Next, a configuration example for automatically increasing the number of pieces of learning data by using evaluation data generated by the evaluation unit 224 shown in FIG. 2 will be discussed with reference to FIG. 12. Like FIG. 11, FIG. 12 also shows a modified configuration example of the feature extraction unit 223, the evaluation unit 224, the learning database 230 and the re-ranking unit 225 of the question answering system 200 shown in FIG. 2. Other components are similar to those shown in FIG. 2.

In the modified configuration example, an evaluation unit 352 is input to feature data from a feature extraction unit 351, applies the SVM technique, for example, executes evaluation processing based on learning data stored in a learning database 353, and outputs the evaluation result to a re-ranking unit 354. To this point, the processing is similar to that in the example described above.

For example, in the SVM applied in the evaluation processing executed by the evaluation unit 352, each feature to be evaluated is categorized into a positive example or a negative example. The positive example/negative example data as the evaluation result is assigned to the feature and stored in the learning database 353. A learning data generation unit 356 acquires the feature data to be evaluated from the evaluation unit 352, assigns information of the set positive example or the set negative example to the feature, and stores the feature data associated with the information in the learning database 353.

Thus, when new learning data is stored in the learning database 353, a learning unit 355 updates the learning model used for evaluation in the SVM and stores the learning model in the learning database 353. The stored new learning model is used for the later evaluation.

According to the modified configuration example, new evaluation result is added to the learning data, whereby the learning model can be updated and it is made possible to timely update the learning model on which change in the user's interest, etc., for example, is reflected and it is made possible to conduct evaluation responsive to the progression of the user's interest.

FOURTH EXAMPLE

In the example described above, the answer candidate list generated by re-ranking the answer candidates in the evaluation value order of the answer candidates is presented to the client. However, since the positive or negative evaluation result can be output in the SVM, only the answer candidates determined as positive examples may be presented.

For example, assuming that the following evaluation values of answer candidates a1 to a3 a1: Evaluation value=0.50,
a2: Evaluation value=−1.03,
a3: Evaluation value=0.90, are obtained as the evaluation result, the re-ranking unit selects only the answer candidates [a1, a3] each having the positive evaluation value, generates a list of the answer candidates [a1, a3], and presents the list to the client. The positive or negative evaluation result can be determined by the positive or negative sign of the evaluation value. As the processing is performed, a list containing a large number of improper answer candidates is not presented, so that the answer candidates can be screened without confusing the user.

FIFTH EXAMPLE

In the above-described examples, the f-structure corresponding to the sentence forming the passage based on the search result is generated and the tree structure based on the f-structure is generated in sequence. In a fifth example as a modified example described below, it is made possible to store generated tree structures in a database and reuse the stored tree structures.

Figure 13:
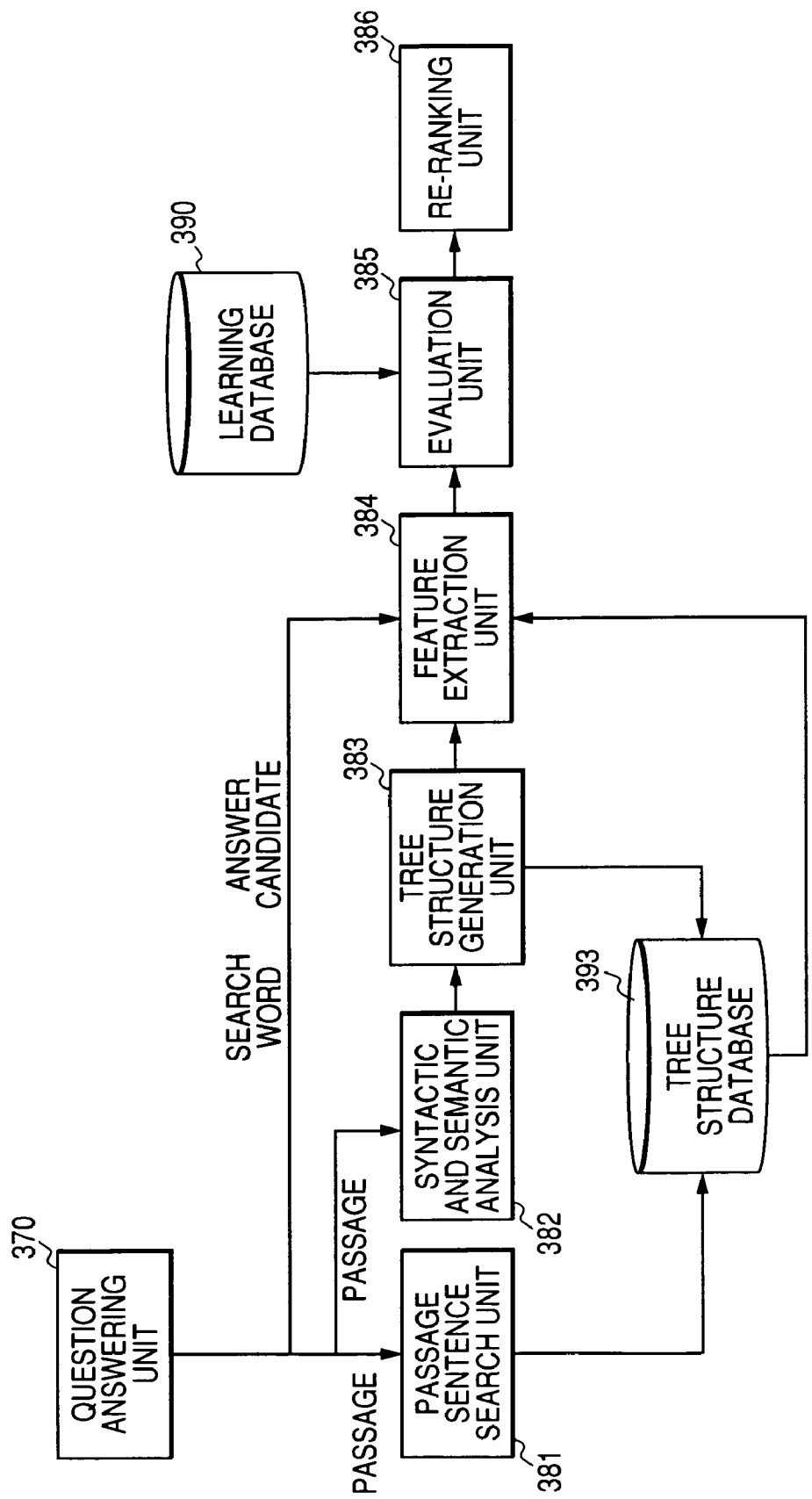
FIG. 13 is a block diagram to show the configuration of the question answering system according to one embodiment of the invention (fifth example)

The configuration example will be discussed with reference to FIG. 13. FIG. 13 shows the general configuration of a question answering system according to the modified example. This question answering system differs from the question answering system 200 shown in FIG. 2 in a passage sentence search unit 381 and a tree structure database 393. A question answering unit 370, a syntactic and semantic analysis unit 382, a tree structure generation unit 383, a feature extraction unit 384, an evaluation unit 385, a re-ranking unit 386, and a learning database 390 are basically similar to those previously described with reference to FIG. 2. The difference from the configuration and processing shown in FIG. 2 will be discussed below.

The question answering system having the configuration in FIG. 13 reuses the tree structures generated in the past. The passage sentence search unit 381 is input to a sentence forming the passage from an information search section of the question answering unit 370 and searches the tree structure database 393 for the same sentence forming the passage. The tree structure database 393 is input to tree structures generated by the tree structure generation unit 383 together with input sentences (sentences forming a passage) and associating them with each other for storage.

The processing sequence in the example is as follows:

Step 1. The passage sentence search unit 381 searches the tree structure database 393 for a sentence forming a passage as a query.

Step 2-a. If the same sentence forming the passage as the sentence to be found is found, the tree structure corresponding to the sentence is acquired from the tree structure database 393 and is sent to the feature extraction unit 384.

Step 2-b. If the same sentence forming the passage as the sentence to be found is not found in the tree structure database 393, the syntactic and semantic analysis unit 382 executes the syntactic and semantic analysis on each sentence in the passage and the tree structure generation unit 383 generates a tree structure. The generated tree structure is stored in the tree structure database 393 together with the sentence in the passage. The later steps are similar to those in the example previously described with reference to FIG. 2.

According to the fifth example, if the tree structure based on the same sentence as the input sentence (passage component sentence) is generated and is stored in the database, syntactic and semantic analysis processing and tree structure generation processing need not be performed and thus efficient processing is accomplished.

SIXTH EXAMPLE

In the example previously described with reference to FIG. 2, the syntactic and semantic analysis unit 221 executes the syntactic and semantic analysis processing on each sentence forming a passage and f-structures are generated. A sixth example wherein only syntactic analysis rather than syntactic and semantic analysis is conducted will be discussed with reference to FIG. 14.

Figure 14:
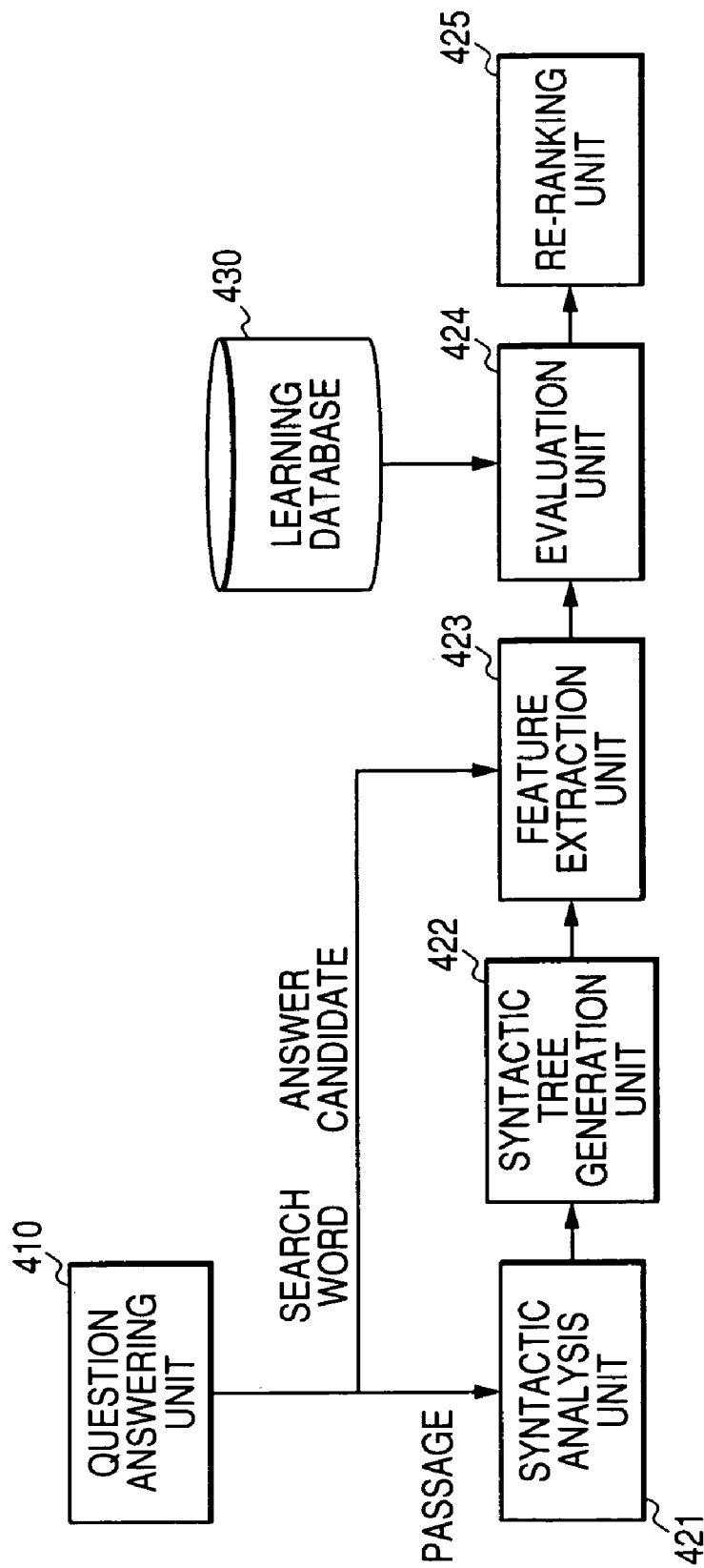
FIG. 14 is a block diagram to show the configuration of evaluation unit of the question answering system according to one embodiment of the invention (sixth example)

A question answering system shown in FIG. 14 differs from the question answering system shown in FIG. 2 in that it has a syntactic analysis unit 421 in place of the syntactic and semantic analysis unit 221 and has a syntactic tree generation unit 422 in place of the tree structure generation unit 222. A question answering unit 410, a feature extraction unit 423, an evaluation unit 424, a re-ranking unit 425, and a learning database 430 are basically similar to those previously described with reference to FIG. 2. The difference from the configuration and processing shown in FIG. 2 will be discussed below.

The syntactic analysis unit 421 executes only syntactic analysis (modification relation) on each sentence in the passage held by the information search section (see FIG. 3) of the question answering unit 410. That is, the semantic analysis processing is not performed. The syntactic tree generation unit 422 generates a syntactic tree based on a result of the syntactic analysis of the sentence forming the passage, which is the analysis result of the syntactic analysis unit 421.

The syntactic tree generated by the syntactic tree generation unit 422 and feature extraction processing from the generated syntactic tree will be discussed with reference to FIG. 15.

Unlike the tree structure previously described with reference to FIG. 5, the syntactic tree generated by the syntactic tree generation unit 422 is not assigned case information (SUBJ, OBJ, etc.,) because the semantic analysis result is not applied to the syntactic tree. Thus, the extracted feature has a representation format in which only data indicating how many predicates a search word (sn) and an answer candidate (an) are concatenated through can be acquired.

As the feature of the search word (sn) and the answer candidate (an) in the example, data indicating how many predicates they are concatenated through is acquired. For example, in FIG. 15A, a search word (s1) and an answer candidate (a1) are concatenated through only one predicate (predicate 1). In this case, the feature between the search word (s1) and the answer candidate (a1) is [1]. This is represented as s1a1:1.

Figure 15B:
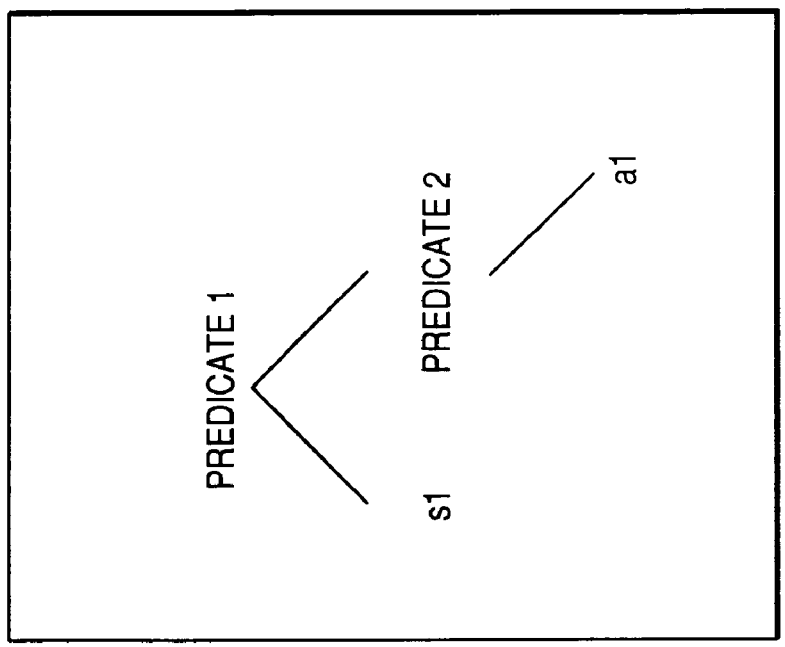
FIG. 15 is a drawing to describe compositions of syntactic trees generated in the question answering system according to the sixth example and feature extraction processing.
Figure 15A:
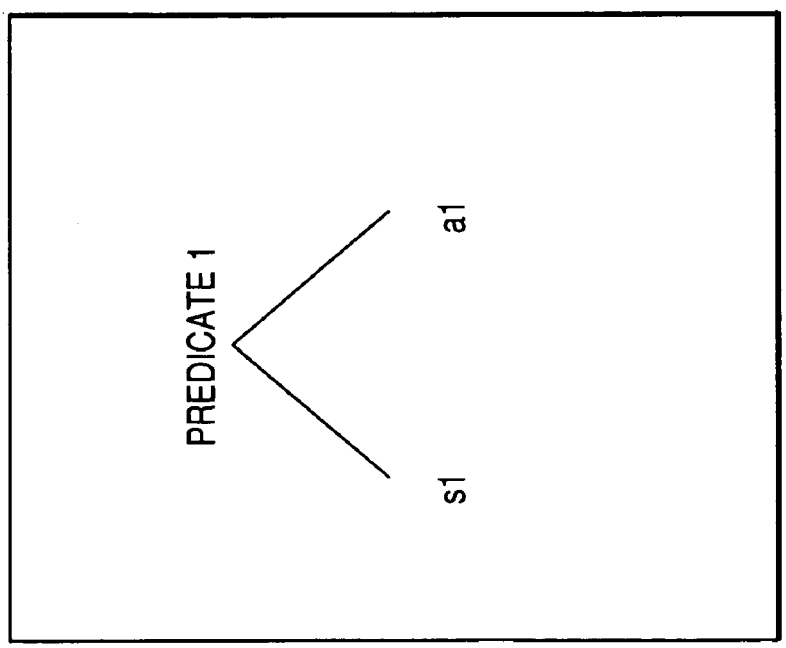

In FIG. 15B, the search word (s1) and the answer candidate (a1) are concatenated through two predicates (predicates 1 and 2). In this case, the feature between the search word (s1) and the answer candidate (a1) is [2]. This is represented as s1a1:2.

Thus, in the example, the semantic analysis processing of a sentence forming the passage is not performed and a syntactic tree is generated only from the syntactic analysis result. Then, how many predicates the search word (sn) and the answer candidate (an) are concatenated through are counted from the syntactic tree, and the count is acquired as the feature. According to the configuration, the semantic analysis processing of a passage component sentence can be skipped and the processing can be speeded up.

Last, a hardware configuration example of an information processing apparatus implementing the question answering system for executing the processing described above will be discussed with reference to FIG. 16. A CPU (Central Processing Unit) 501 executes processing corresponding to an OS (Operating System) and executes the search word extraction, the search processing, the syntactic and semantic analysis processing as passage analysis, the tree structure generation processing, and the feature extraction processing based on an input question, the evaluation processing based on the machine learning technique, re-ranking processing, etc., described above in the examples. The CPU 501 executes the processing in accordance with a computer program stored in a data storage section of ROM, a hard disk, etc., of each information processing apparatus.

ROM (Read-Only Memory) 502 stores the program, operation parameters, etc., used by the CPU 501. RAM (Random Access Memory) 503 stores a program used in execution of the CPU 501, parameters, etc., changed whenever necessary in the execution of the CPU 501. They are connected by a host bus 504 implemented as a CPU bus, etc.

The host bus 504 is connected to an external bus 506 of a PCI (Peripheral Component Interconnect/Interface) bus, etc., via a bridge 505.

A keyboard 508 and a pointing device 509 are input devices operated by the user. A display 510 is implemented as a liquid crystal display, a CRT (cathode ray tube), or the like for displaying various pieces of information as text or an image.

An HDD (Hard Disk Drive) 511 contains a hard disk and drives the hard disk for recording or reproducing (playing back) a program executed by the CPU 501 and information. The hard disk is used as answer candidate and passage storage means as the search result, storage means of the learning data used for evaluation processing incorporating the machine learning technique, tree structure data storage means, answer candidate storage means, etc., for example, and further stores various computer programs such as a data processing program.

A drive 512 reads data or a program recorded on a removable record medium 521 such as a magnetic disk, an optical disk, a magneto-optical disk, or semiconductor memory mounted, and supplies the data or the program to the RAM 503 connected via the interface 507, the external bus 506, the bridge 505, and the host bus 504.

A connection port 514 is a port for connecting an external connection machine 522 and has a connection section of USB, IEEE 1394, etc. The connection port 514 is connected to the CPU 501, etc., via the interface 507, the external bus 506, the bridge 505, the host bus 504, etc. A communication section 515 is connected to a network for executing communications with a client and a network connection server.

The hardware configuration example of the information processing apparatus applied as the question answering system shown in FIG. 16 is an example of an apparatus incorporating a PC and the question answering system of the invention is not limited to the configuration shown in FIG. 16 and may have any configuration if the configuration has the capability of executing the processing described above in the examples.

While the invention has been described in detail in its preferred embodiment (examples), it is to be understood that modifications will be apparent to those skilled in the art without departing from the spirit and the scope of the invention. That is, the invention is disclosed for illustrative purposes only and it is to be understood that the invention is not limited to the specific embodiment (examples) thereof except as defined in the claims.

The processing sequence described in the specification can be executed by both or either of hardware and software. To execute software processing, the program recording the processing sequence can be installed in memory in a computer incorporated in dedicated hardware for execution or can be installed in a general-purpose computer that can execute various types of processing for execution.

For example, the program can be previously recorded on a hard disk or in ROM (Read-Only Memory) as a record medium or can be stored (recorded) temporarily or permanently on a removable record medium such as a flexible disk, a CD-ROM (Compact Disk Read-Only Memory), an MO (Magneto Optical) disk, a DVD (Digital Versatile Disk), a magnetic disk, or semiconductor memory. Such a removable record medium can be provided as a package software product.

The program not only can be installed in a computer from a removable record medium as described above, but also can be transferred by radio waves from a download site to a computer or can be transferred to a computer in a wired manner through a network such as the Internet for the computer to receive the program thus transferred and install the program on a record medium such as a hard disk incorporated.

The various types of processing described in the specification may be executed not only in time sequence according to the description, but also in parallel or individually in response to the processing capability of the apparatus for executing the processing or as required. The system in the specification is a logical set made up of a plurality of units (apparatus) and is not limited to a set of units (apparatus) housed in a single cabinet.

What is claimed is:

1. A question answering system comprising:
a CPU;
a question answering unit that executes search processing on a basis of an input question and acquires answer candidates to the question;
an analysis unit that executes syntactic analysis processing or syntactic and semantic analysis processing on a passage obtained as a result of the search processing executed by the question answering unit to generate an analysis result holding a case relation between words of the passage to be analyzed;
a tree structure generation unit that generates a tree structure based on predicate-argument structure explicitly expressing the case relation on a basis of the analysis result of the analysis unit;
a feature extraction unit that extracts a relation between a search word applied in the search processing executed by the question answering unit and each acquired answer candidate as a feature corresponding to each answer candidate from the tree structure generated by the tree structure generation unit;
an evaluation unit that determines an evaluation value of each answer candidate on a basis of the feature extracted by the feature extraction unit;
a re-ranking unit that re-ranks the answer candidates on a basis of the evaluation values determined by the evaluation unit;
a tree structure database that stores data of the tree structure generated by the tree structure generation unit in association with the passage based on which the data of the tree structure is generated; and
a passage search unit that executes search processing of the tree structure database on a basis of the passage input from the question answering unit, the question answering unit, analysis unit, tree structure generation unit, feature extraction unit, evaluation unit, re-ranking unit, and passage search unit being executed by the CPU,
wherein if the search processing executed by the passage search unit finds a passage in the tree structure database, the tree structure generation processing executed by the tree structure generation unit is skipped and the tree structure stored in association with the passage found from the tree structure database is used.

2. The question answering system according to claim 1, wherein the evaluation unit executes evaluation processing, to which a machine learning technique is applied, on the feature extracted by the feature extraction unit to determine the evaluation value of each answer candidate.

3. A question answering system comprising:
a CPU;
a question answering unit that executes search processing on a basis of an input question and acquires answer candidates to the question;
an analysis unit that executes syntactic analysis processing or syntactic and semantic analysis processing on a passage obtained as a result of the search processing executed by the question answering unit to generate an analysis result holding a case relation between words of the passage to be analyzed;
a tree structure generation unit that generates a tree structure based on predicate-argument structure explicitly expressing the case relation on a basis of the analysis result of the analysis unit;
a feature extraction unit that extracts a relation between a search word applied in the search processing executed by the question answering unit and each acquired answer candidate as a feature corresponding to each answer candidate from the tree structure generated by the tree structure generation unit;
an evaluation unit that determines an evaluation value of each answer candidate on a basis of the feature extracted by the feature extraction unit; and
a re-ranking unit that re-ranks the answer candidates on a basis of the evaluation values determined by the evaluation unit,
wherein:
the analysis unit executes the syntactic analysis processing on the passage, the tree structure generation unit generates a syntactic tree on a basis of a result of the syntactic analysis processing executed by the analysis unit, the feature extraction unit executes processing of extracting number of predicates between the search word and each answer candidate as the feature on a basis of the syntactic tree, and the question answering unit, analysis unit, tree structure generation unit, feature extraction unit, evaluation unit, and re-ranking unit are executed by the CPU.

4. The question answering system according to claim 1, wherein the evaluation unit comprises:
a plurality of evaluation unit that execute evaluation processing, to which different machine learning techniques are applied, on the feature extracted by the feature extraction unit; and
an evaluation integration unit that integrates a plurality of evaluation results of the plurality of evaluation unit to determine a final evaluation value of each answer candidate.

5. A data search method comprising:
executing search processing on a basis of an input question and acquiring answer candidates to the question;
executing syntactic analysis processing or syntactic and semantic analysis processing on a passage obtained as a result of the search processing to generate an analysis result holding a case relation between words of the passage to be analyzed;
generating a tree structure based on predicate-argument structure explicitly expressing the case relation on a basis of a result of the analysis;
extracting a relation between a search word applied in the search processing and each acquired answer candidate as a feature corresponding to each answer candidate from the tree structure generated;
determining an evaluation value of each answer candidate on a basis of the feature extracted;
searching a tree structure database storing data of the tree structure in association with the passage based on which the data of the tree structure is generated with using the passage acquired as queries;
executing feature extraction processing using a tree structure stored in association with the passage found from the tree structure database if the searching of the tree structure database finds a passage in the tree structure database, and
re-ranking the answer candidates on a basis of the evaluation values determined.

6. The data search method according to claim 5, wherein the determining of the evaluation value comprises executing evaluation processing, to which a machine learning technique is applied, on the feature extracted to determine the evaluation value of each answer candidate.

7. The data search method according to claim 5, wherein the determining of the evaluation value comprises:
executing a plurality of evaluation processings, to which different machine learning techniques are applied, on the feature extracted; and
integrating a plurality of evaluation results to determine a final evaluation value of each answer candidate.

8. A data search method comprising:
executing search processing on a basis of an input question and acquiring answer candidates to the question;
executing syntactic analysis processing or syntactic and semantic analysis processing on a passage obtained as a result of the search processing to generate an analysis result holding a case relation between words of the passage to be analyzed;
generating a tree structure based on predicate-argument structure explicitly expressing the case relation on a basis of a result of the analysis;
extracting a relation between a search word applied in the search processing and each acquired answer candidate as a feature corresponding to each answer candidate from the tree structure generated;
determining an evaluation value of each answer candidate on a basis of the feature extracted; and
re-ranking the answer candidates on a basis of the evaluation values determined,
wherein:
the executing of the syntactic analysis processing or the syntactic and semantic analysis processing comprises executing the syntactic analysis processing on the passage,
the generating of the tree structure comprises generating a syntactic tree on a basis of a result of the syntactic analysis processing, and the extracting comprises executing processing of extracting number of predicates between the search word and each answer candidate as the feature on a basis of the syntactic tree.

9. A computer-readable medium storing a program for causing a computer to execute a data search processing comprising:
executing search processing on a basis of an input question and acquires answer candidates to the question;
executing syntactic analysis processing on a passage obtained as a result of the search processing to generate an analysis result holding a case relation between words of the passage to be analyzed;
generating a syntactic tree structure based on predicate-argument structure explicitly expressing the case relation on a basis of the syntactic analysis;
extracting a relation between a search word applied in the search processing and each acquired answer candidate as a feature corresponding to each answer candidate from the tree structure generated;
determining an evaluation value of each answer candidate on a basis of the feature extracted;
searching a tree structure database storing data of the tree structure in association with the passage based on which the data of the tree structure is generated with using the passage acquired as queries;
executing feature extraction processing using a tree structure stored in association with the passage found from the tree structure database if the searching of the tree structure database finds a passage in the tree structure database, and
re-ranking the answer candidates on a basis of the evaluation values determined.

10. A question answering system comprising:
a CPU;
a question answering unit that executes search processing on a basis of an input question and acquires answer candidates to the question;
an analysis unit that executes syntactic and semantic analysis processing on a passage obtained as a result of the search processing executed by the question answering unit to generate a f-structure holding a case relation between words of the passage to be analyzed;
a tree structure generation unit that generates a tree structure based on predicate-argument structure explicitly expressing the case relation on a basis of the f-structure of the analysis unit;
a feature extraction unit that extracts the case relation between a search word applied in the search processing executed by the question answering unit and each acquired answer candidate as a feature corresponding to each answer candidate on the basis of the tree structure generated by the tree structure generation unit;

an evaluation unit that determines an evaluation value of each answer candidate on a basis of the feature extracted by the feature extraction unit; and a re-ranking unit that re-ranks the answer candidates on a basis of the evaluation values determined by the evaluation unit, wherein the question answering unit, analysis, unit, tree structure generation unit, feature extraction unit, evaluation unit, and re-ranking unit are executed by the CPU.

11. A data search method comprising:

executing search processing on a basis of an input question and acquiring answer candidates to the question;

executing syntactic and semantic analysis processing on a passage obtained as a result of the search processing to generate a f-structure holding a case relation between words of the passage to be analyzed;

generating a tree structure based on predicate-argument structure explicitly expressing the case relation on a basis of the f-structure;

extracting a relation between a search word applied in the search processing and each acquired answer candidate as a feature corresponding to each answer candidate from the tree structure generated;

determining an evaluation value of each answer candidate on a basis of the feature extracted; and re-ranking the answer candidates on a basis of the evaluation values determined.

12. A computer-readable medium storing a program for causing a computer to execute a data search processing comprising:

executing search processing on a basis of an input question and acquiring answer candidates to the question;

executing syntactic and semantic analysis processing on a passage obtained as a result of the search processing to generate a f-structure holding a case relation between words of the passage to be analyzed;

generating a tree structure based on predicate-argument structure explicitly expressing the case relation on a basis of the f-structure;

extracting a relation between a search word applied in the search processing and each acquired answer candidate as a feature corresponding to each answer candidate from the tree structure generated;

determining an evaluation value of each answer candidate on a basis of the feature extracted; and re-ranking the answer candidates on a basis of the evaluation values determined.

13. A computer-readable medium storing a program for causing a computer to execute a data search processing comprising:

executing search processing on a basis of an input question and acquires answer candidates to the question;

executing syntactic analysis processing on a passage obtained as a result of the search processing to generate an analysis result holding a case relation between words of the passage to be analyzed;

generating a syntactic tree structure based on predicate-argument structure explicitly expressing the case relation on a basis of the syntactic analysis;

extracting a relation between a search word applied in the search processing and each acquired answer candidate as a feature corresponding to each answer candidate from the tree structure generated;

determining an evaluation value of each answer candidate on a basis of the feature extracted; and re-ranking the answer candidates on a basis of the evaluation values determined, wherein:

the executing of the syntactic analysis processing or the syntactic and semantic analysis processing comprises executing the syntactic analysis processing on the passage, the generating of the tree structure comprises generating a syntactic tree on a basis of a result of the syntactic analysis processing, and the extracting comprises executing processing of extracting number of predicates between the search word and each answer candidate as the feature on a basis of the syntactic tree.

* * * * *